(12) United States Patent
Kawakami et al.

(10) Patent No.: US 9,658,779 B2
(45) Date of Patent: May 23, 2017

(54) COMPUTER SYSTEM AND CONTROL METHOD FOR COMPUTER SYSTEM

(71) Applicant: Hitachi, Ltd., Tokyo (JP)

(72) Inventors: Norihiko Kawakami, Tokyo (JP); Azuma Kano, Tokyo (JP); Keisuke Hatasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/765,900

(22) PCT Filed: Jul. 31, 2013

(86) PCT No.: PCT/JP2013/070741
§ 371 (c)(1),
(2) Date: Aug. 5, 2015

(87) PCT Pub. No.: WO2015/015592
PCT Pub. Date: Feb. 5, 2015

(65) Prior Publication Data
US 2015/0378604 A1    Dec. 31, 2015

(51) Int. Cl.
*G06F 3/06* (2006.01)
*G06F 13/40* (2006.01)
*G06F 12/08* (2016.01)
*G06F 13/10* (2006.01)
*G06F 9/50* (2006.01)
(Continued)

(52) U.S. Cl.
CPC .............. *G06F 3/061* (2013.01); *G06F 3/06* (2013.01); *G06F 3/067* (2013.01); *G06F 3/0655* (2013.01); *G06F 3/0659* (2013.01); *G06F 3/0665* (2013.01); *G06F 3/0688* (2013.01); *G06F 9/46* (2013.01); *G06F 9/50* (2013.01); *G06F 12/0875* (2013.01); *G06F 13/10* (2013.01); *G06F 13/4022* (2013.01); *G06F 2212/452* (2013.01)

(58) Field of Classification Search
CPC ........ G06F 3/0655; G06F 3/067; G06F 13/10; G06F 9/50; G06F 9/46; G06F 3/06
See application file for complete search history.

(56) References Cited

U.S. PATENT DOCUMENTS 8,898,373 B1 * 11/2014 Kang .................. G06F 12/0246
711/103
2007/0038819 A1 * 2/2007 Miki ..................... G06F 3/0605
711/154
(Continued)

FOREIGN PATENT DOCUMENTS

WO    2012/107955 A1    8/2012

OTHER PUBLICATIONS

International Search Report of PCT/JP2013/070741.

*Primary Examiner* — Idriss N Alrobaye
*Assistant Examiner* — Ronald Modo
(74) *Attorney, Agent, or Firm* — Mattingly & Malur, PC

(57) ABSTRACT

A computer system comprises a computer sub-system. The computer sub-system includes a physical resource, on which both a virtual server as a virtual server apparatus and a virtual storage as a virtual storage apparatus are based. That is, a part of the physical resource is assigned to the virtual server, and another part of the physical resource is assigned to the virtual storage. Any part of the physical resource may be assigned to either of the virtual server and the virtual storage.

13 Claims, 30 Drawing Sheets

(51) Int. Cl.
 *G06F 9/46* (2006.01)
 *G06F 12/0875* (2016.01)

(56) References Cited

U.S. PATENT DOCUMENTS

| | | | |
|---|---|---|---|
| 2012/0179823 A1* | 7/2012 | Hataski .................. | G06F 9/461 709/226 |
| 2012/0265882 A1* | 10/2012 | Hataski ............... | G06F 9/5083 709/226 |
| 2014/0059271 A1* | 2/2014 | Meir ....................... | G06F 3/061 711/103 |
| 2016/0239322 A1* | 8/2016 | Watanabe ........... | G06F 9/45558 |

* cited by examiner

Blade resource management table

Blade assignment management table

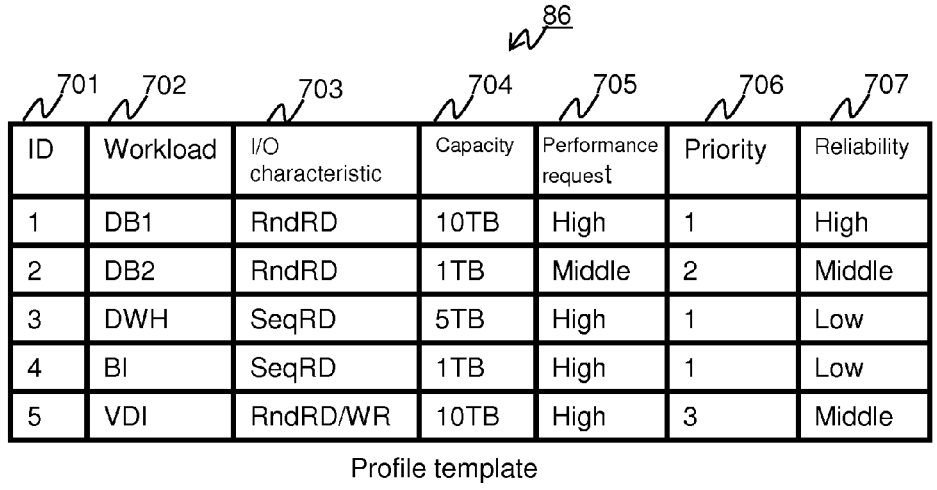

| ID | Workload | I/O characteristic | Capacity | Performance request | Priority | Reliability |
|---|---|---|---|---|---|---|
| 1 | DB1 | RndRD | 10TB | High | 1 | High |
| 2 | DB2 | RndRD | 1TB | Middle | 2 | Middle |
| 3 | DWH | SeqRD | 5TB | High | 1 | Low |
| 4 | BI | SeqRD | 1TB | High | 1 | Low |
| 5 | VDI | RndRD/WR | 10TB | High | 3 | Middle |

Profile template

Fig. 7

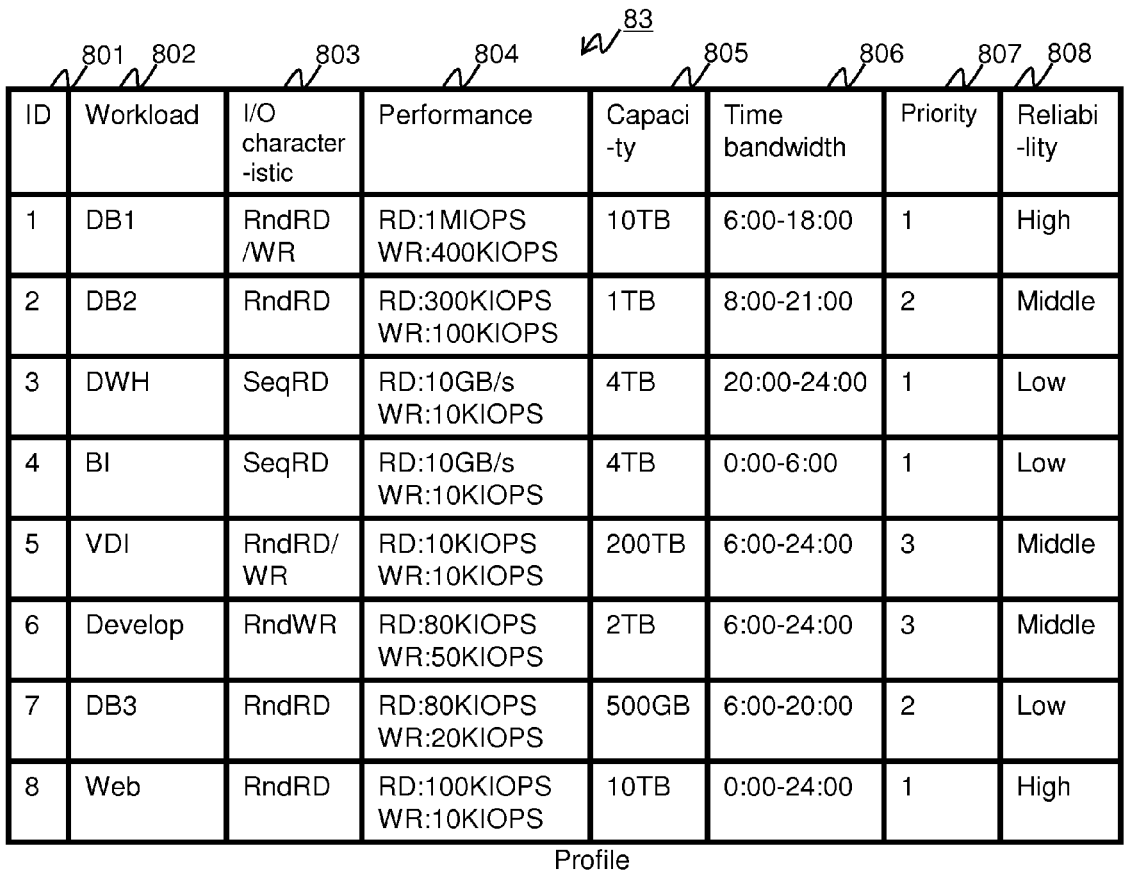

| ID | Workload | I/O characteristic | Performance | Capacity | Time bandwidth | Priority | Reliability |
|---|---|---|---|---|---|---|---|
| 1 | DB1 | RndRD/WR | RD:1MIOPS WR:400KIOPS | 10TB | 6:00-18:00 | 1 | High |
| 2 | DB2 | RndRD | RD:300KIOPS WR:100KIOPS | 1TB | 8:00-21:00 | 2 | Middle |
| 3 | DWH | SeqRD | RD:10GB/s WR:10KIOPS | 4TB | 20:00-24:00 | 1 | Low |
| 4 | BI | SeqRD | RD:10GB/s WR:10KIOPS | 4TB | 0:00-6:00 | 1 | Low |
| 5 | VDI | RndRD/WR | RD:10KIOPS WR:10KIOPS | 200TB | 6:00-24:00 | 3 | Middle |
| 6 | Develop | RndWR | RD:80KIOPS WR:50KIOPS | 2TB | 6:00-24:00 | 3 | Middle |
| 7 | DB3 | RndRD | RD:80KIOPS WR:20KIOPS | 500GB | 6:00-20:00 | 2 | Low |
| 8 | Web | RndRD | RD:100KIOPS WR:10KIOPS | 10TB | 0:00-24:00 | 1 | High |

Profile

| | 901 | 902 | 903 | 904 | 905 | 906 |
|---|---|---|---|---|---|---|
| | ID | Workload | Core requirement | Bandwidth requirement | Capacity | Assignment |
| | 1 | DB1 | 8 | 10GB/s | 10TB | Storage1 Server1 |
| | 2 | DB2 | 4 | 5GB/s | 1TB | Storage2 Server2 |
| | 3 | DWH | 6 | 10GB/s | 4TB | Storage1 Server1 |
| | 4 | BI | 8 | 10GB/s | 4TB | Storage2 Server2 |
| | 5 | VDI | 2 | 500MB/s | 200TB | Storage1 Server3 |
| | 6 | Develop | 2 | 1GB/s | 2TB | Storage2 Server4 |
| | 7 | DB3 | 2 | 1GB/s | 500GB | Storage3 Server5 |
| | 8 | Web | 2 | 1GB/s | 10TB | Storage2 Server6 |

Profile assignment management table

Fig. 9

| ID | Type | Type-specific ID |
|---|---|---|
| 1 | Flash | 1 |
| 2 | Flash | 2 |
| 3 | Flash | 3 |
| 4 | Network | 1 |
| 5 | Network | 2 |
| 6 | Network | 3 |
| 7 | SAS | 1 |
| 8 | SAS | 2 |

I/O module management table

Fig. 10

| To \ From | Storage1 | Storage2 | Storage3 | Server1 | Server2 | Server3 | Server4 | Server5 | Server6 |
|---|---|---|---|---|---|---|---|---|---|
| Storage 1 |  | 30GB/s | 10GB/s | 10GB/s | 10GB/s | 10GB/s | 10GB/s | 5GB/s | 5GB/s |
| Storage 2 | 30GB/s |  | 10GB/s | 10GB/s | 10GB/s | 10GB/s | 10GB/s | 5GB/s | 5GB/s |
| Storage 3 | 10GB/s | 10GB/s |  | 1GB/s | 1GB/s | 1GB/s | 1GB/s | 10GB/s | 1GB/s |
| Server1 | 10GB/s | 10GB/s | 1GB/s |  | 5GB/s | 1GB/s | 1GB/s | 1GB/s | 1GB/s |
| Server2 | 10GB/s | 10GB/s | 1GB/s | 5GB/s |  | 1GB/s | 1GB/s | 1GB/s | 1GB/s |
| Server3 | 10GB/s | 10GB/s | 1GB/s | 1GB/s | 1GB/s |  | 5GB/s | 1GB/s | 1GB/s |
| Server4 | 10GB/s | 10GB/s | 1GB/s | 1GB/s | 1GB/s | 5GB/s |  | 1GB/s | 1GB/s |
| Server5 | 5GB/s | 5GB/s | 10GB/s | 1GB/s | 1GB/s | 1GB/s | 1GB/s |  | 1GB/s |
| Server6 | 5GB/s | 5GB/s | 1GB/s | 1GB/s | 1GB/s | 1GB/s | 1GB/s | 1GB/s |  |

Inter-blade bandwidth management table

Fig. 11

| To \ From | I/O 1 (Flash1) | I/O 2 (Flash2) | I/O 3 (Flash3) | I/O 4 (Network1) | I/O 5 (Network2) | I/O 6 (Network3) | I/O 7 (SAS1) | I/O 8 (SAS2) |
|---|---|---|---|---|---|---|---|---|
| Storage 1 | 2GB/s | 2GB/s | 1GB/s | 8GB/s | — | 10GB/s | 12GB/s | 12GB/s |
| Storage 2 | 3GB/s | — | 1GB/s | 8GB/s | — | 10GB/s | 12GB/s | 12GB/s |
| Storage 3 | — | 2GB/s | — | — | — | — | — | — |
| Server1 | 2GB/s | 2GB/s | — | — | 4GB/s | 1GB/s | — | — |
| Server2 | 2GB/s | 2GB/s | 1GB/s | — | 4GB/s | 1GB/s | — | — |
| Server3 | 500MB/s | 500MB/s | 300MB/s | — | — | 10GB/s | — | — |
| Server4 | 500MB/s | 500MB/s | 300MB/s | — | — | 10GB/s | — | — |
| Server5 | — | — | — | — | — | — | — | — |
| Server6 | — | — | — | — | — | — | — | — |

Blade-I/O module bandwidth management table

Fig. 12

Blade bandwidth management table

Backbone bandwidth management table

Cache bandwidth management table

I/O module bandwidth management table

Flash resource management table

Flash resource assignment management table

Network resource management table

Network resource assignment management table

| SAS ID | Assignment | Bandwidth |
|---|---|---|
| 1 | Storage1 | 12Gb/s |
| 2 | Storage2 | 12Gb/s |
|   | Server6 | 6Gb/s |

SAS resource assignment management table

Fig. 21

COMPUTER SYSTEM AND CONTROL METHOD FOR COMPUTER SYSTEM

TECHNICAL FIELD

The present invention generally relates to management or control of a computer system.

BACKGROUND ART

Virtualization technologies for virtualizing a physical server apparatus or a physical storage apparatus are generally known. For example, PTL 1 discloses a technology for creating a plurality of virtual storage apparatuses having a plurality of logical resources, respectively, obtained by logically splitting a physical resource possessed by a physical storage apparatus into a plurality of logical resources.

CITATION LIST

Patent Literature

[PTL 1]
WO 2012/107955

SUMMARY OF INVENTION

Technical Problem

In general, a computer system is composed of a physical storage apparatus and a physical server apparatus (physical host apparatus) configured to input and output data to and from the physical storage apparatus. The physical server apparatus and the physical storage apparatus are mutually independent devices. In the physical server apparatus, a plurality of virtual server apparatuses are created on the basis of a physical resource possessed by the physical server apparatus. In the physical storage apparatus, a plurality of virtual storage apparatuses are created on the basis of a physical source possessed by the physical storage apparatus. In the computer system, the virtual server apparatus occasionally carries a high load, and the virtual storage apparatus occasionally carries a high load.

Solution to Problem

A computer system comprises a computer sub-system. The computer sub-system includes a physical resource, on which both a virtual server as a virtual server apparatus and a virtual storage as a virtual storage apparatus are based. That is, a part of the physical resource is assigned to the virtual server, and another part of the physical resource is assigned to the virtual storage. Any part of the physical resource may be assigned to either of the virtual server and the virtual storage.

Specifically, the computer sub-system includes: a switch device configured to relay communication according to a predetermined interface; a cache memory coupled to the switch device; a plurality of computer devices coupled to the switch device; and a plurality of I/O (Input/Output) devices coupled to the switch device. Each of the computer devices has a computer resource including a processor and a memory, and is configured to perform communication according to the predetermined interface. Each of the I/O devices is configured to perform communication according to the predetermined interface. At least the plurality of computer devices are physical resources on which a virtual server as a virtual server apparatus and a virtual storage as a virtual storage apparatus are based. Each of the computer devices is capable of implementing operation of both the virtual server and the virtual storage. A first computer device portion as a first portion of the plurality of computer devices is assigned to the virtual server. A second computer device portion as a second portion of the plurality of computer devices, an I/O device portion as at least a part of the plurality of I/O devices, and a cache portion as at least a part of the cache memory are assigned to the virtual storage. The virtual server is configured to issue an I/O command, the I/O command being transmitted from the first computer device portion to the second computer device portion, and the virtual storage is configured to perform I/O of data according to the I/O command by using the I/O device portion, and write data according to the I/O command into the cache portion.

Preferably, the computer sub-system may be constructed to have such a logical configuration that conditions matching a request for an application executed in the computer sub-system are met when such a request is input by a user.

BRIEF DESCRIPTION OF DRAWINGS

FIG. 7 shows a profile template table 86.

FIG. 8 shows a profile table 83.

FIG. 9 shows a profile assignment management table 76.

FIG. 10 shows an I/O module management table 64.

FIG. 11 shows an inter-blade bandwidth management table 62.

FIG. 12 shows a blade-I/O module bandwidth management table 65.

FIG. 21 shows an SAS resource assignment management table 75.

DESCRIPTION OF EMBODIMENTS

Figure 1A:
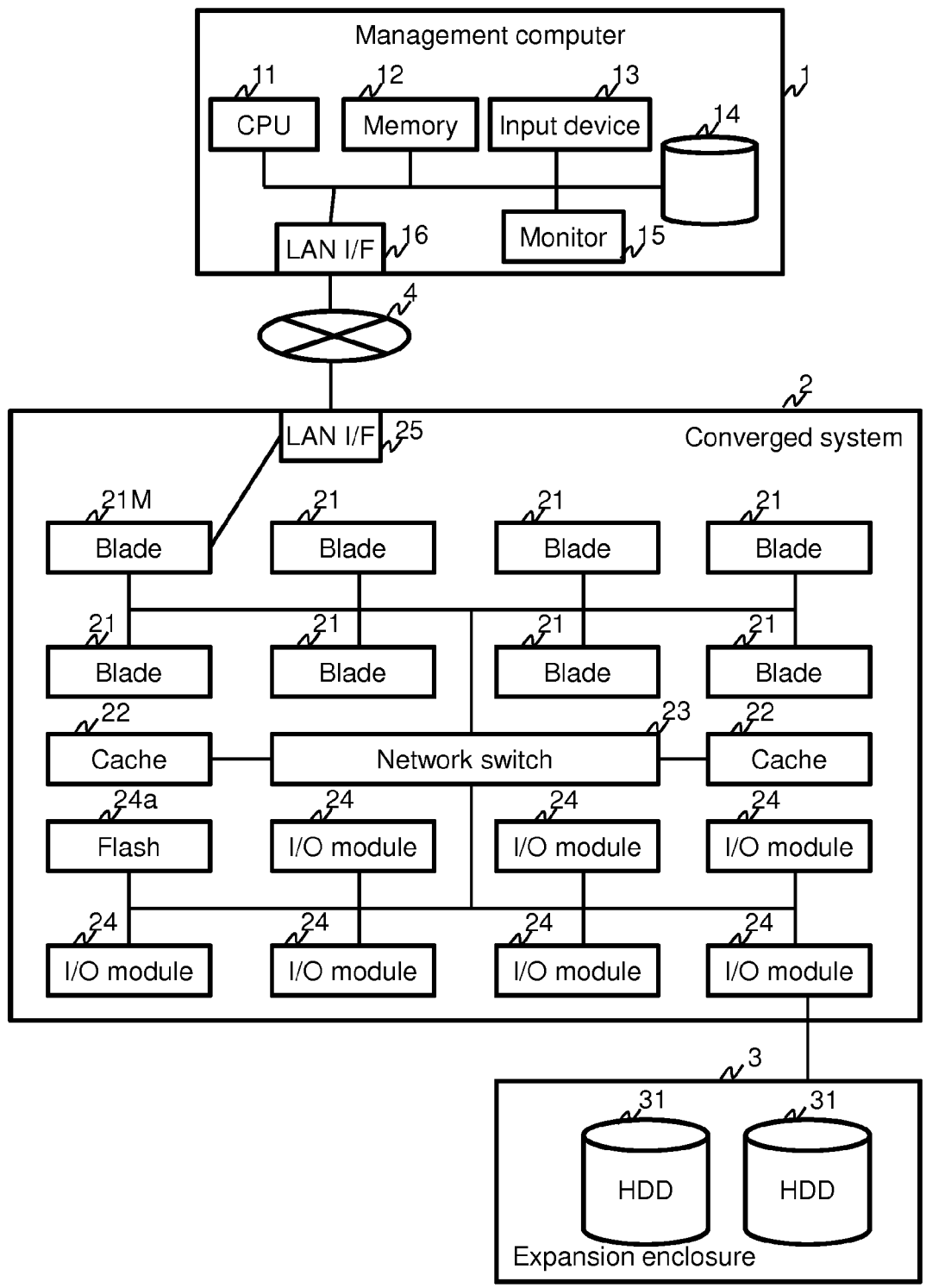
FIG. 1A shows the configuration of a system according to an embodiment.

An embodiment will be described below.

Although the expression "aaa table" is used to describe various information in the following description, the various information may be expressed in a data structure other than a table. In order to indicate independence from the data structure, the term "aaa table" may be replaced with the term "aaa information".

Although an ID (identifier) or a number is used as information for identifying a target in the following description, the ID or the number may be replaced with other types of identification information.

In the following description, reference numerals affixed to elements of the same type include an identical parent number. In the case where elements of the same type are described without differentiation, only the parent number in the reference numerals is used.

In the following description, the term "program" is occasionally used as a subjective to describe a process. However, the program is executed by a processor (for example, a CPU (Central Processing Unit)) possessed by a control device to perform a determined process using a storage resource (e.g. a memory) and/or a communication interface device (e.g. a communication port). Therefore, the subject of the process may be a processor or a computer having the processor. Apart or all of the process performed by the processor may be performed by a hardware circuit possessed by the control device. A computer program may be installed in the control device from a program source. The program source may be a program distribution server or a storage medium, for example.

In the following description, the communication interface device is occasionally abbreviated as "I/F".

In the following description, a collection of one or more computers configured to manage a storage apparatus included in a computer system and display information for display may be referred to as a "management system". In the case where a management computer displays the information for display, the management computer serves as the management system. In addition, a combination of the management computer and a display computer also serves as the management system. In order to enhance the speed and the reliability of a management process, a plurality of computers may be used to achieve a process that is identical or similar to that performed by the management computer. In this case, the plurality of computers (which may include the display computer in the case where the display computer is used for display) serve as the management system. In the embodiment, the management computer serves as the management system. The phrase "the management computer displays information" may indicate that information is displayed on a display device possessed by the management computer, or may indicate that information for display is transmitted to the display computer coupled to the management computer. In the latter case, the display computer displays information represented by the information for display on the display device possessed by the display computer.

The meanings of the terms used in the following description are defined as follows.

The term "VOL" is the abbreviation of a logical volume, and indicates a logical storage device. The VOL may be a real VOL (RVOL), or may be a virtual VOL (VVOL). The VOL may include an online VOL provided to an external apparatus (e.g. a server apparatus) coupled to a storage apparatus providing the VOL, and an offline VOL not provided to an external device (not recognized by the external device).

The term "RVOL" indicates a VOL based on a physical storage resource possessed by a storage apparatus having the RVOL (e.g. a RAID (Redundant Array of Independent (or Inexpensive) Disks) group formed from a plurality of PDEVs).

Examples of the "VVOL" may include an externally coupled VOL (EVOL) according to a storage virtualization technology and that is based on a storage resource (e.g. a VOL) of an external storage apparatus coupled to a storage apparatus having the VVOL, a VOL (TPVOL) according to a capacity virtualization technology (typically, Thin Provisioning) and that is formed from a plurality of virtual pages (a virtual storage area), and a snapshot VOL provided as a snapshot of an original VOL. The TPVOL is typically an online VOL. The snapshot VOL may be an RVOL.

The term "PDEV" is the abbreviation of a non-volatile physical storage device. A plurality of PDEVs may form a plurality of RAID groups. The RAID group may be referred to as a "parity group".

The term "pool" indicates a logical storage area (e.g. a collection of a plurality of pool VOLs), and may be prepared for each usage. Examples of the pool may include a TP pool and a snapshot pool. The TP pool is a storage area formed from a plurality of real pages (a real storage area). A real page from the TP pool may be assigned to a virtual page of the TPVOL. The snapshot pool may be a storage area configured to store data saved from an original VOL. The pool (typically, the TP pool) may have a plurality of tiers with different performances (e.g. I/O (Input/Output) performances). Each tier may be formed from one or a plurality of pool VOLs with approximately the same I/O performance. In the pool, data may be transferred between the diers in units of pages.

The term "pool VOL" indicates a VOL that serves as a constituent element of the pool. The pool VOL may be an RVOL, or may be an EVOL. The pool VOL is typically an offline VOL.

Virtual machines include virtual storage apparatuses and virtual server apparatuses configured to perform I/O of data to and from the virtual storage apparatuses. The virtual storage apparatuses may be roughly divided into virtual PDEVs and virtual storage controllers configured to control I/O of data to and from the virtual PDEVs. The virtual PDEV is a virtual device based on one or a plurality of PDEVs. In the following description, the virtual server apparatus is referred to as a "virtual server", the virtual storage apparatus is referred to as a "virtual storage", the virtual storage controller is referred to as a "virtual CTL". They are referred to collectively as "virtual machines" when no differentiation is made.

FIG. 1A shows the configuration of a computer system according to an embodiment.

First, an overview of the embodiment will be described. The computer system has an converged system 2 and a management computer 1 coupled to the converged system 2. An expansion enclosure 3 may be coupled to the converged system 2. The management computer 1 and the converged system 2 are coupled via a LAN (Local Area Network) 4. Other communication networks may be adopted in place of the LAN 4. A virtual server and a virtual storage are implemented on the basis of a physical resource of the converged system 2. One or a plurality of virtual servers may be provided, and one or a plurality of virtual storages may be provided. The term "physical resource" of the converged system 2 as used in the embodiment indicates a group of physical devices on which any of the virtual server and the virtual storage may be based. For example, the physical resource may be, of a plurality of blades 21 and a plurality of I/O modules 24, at least the plurality of blades 21. At least the blades 21, of the blades 21 and the I/O modules 24, may be used for both the virtual server and the virtual storage. In other words, a physical resource portion of the converged system 2 is occasionally assigned to the virtual server, and occasionally assigned to the virtual storage. The management computer 1 receives a user request from a user, the user request being a request related to an application program (such as a request for performance to be demonstrated, for example), and decides the configuration for meeting the user request. For example, the management computer 1 may decide the type of a virtual machine to be created by the converged system 2, the number of virtual machines, a physical resource portion to be assigned to the virtual machine, and so forth on the basis of the performance and the type of each physical resource portion of the converged system 2. If a user request for a first application program is met even if a physical resource portion on which a first virtual machine assigned to the first application program is based is reduced, the management computer 1 may reduce the physical resource portion on which the first virtual machine is based, and assign a reduced amount of the physical resource portion assigned to a virtual machine to be assigned to a second application program. With such control, a logical configuration that can meet as large a number of user requests as possible can be constructed in the converged system 2.

A detailed description follows.

The management computer 1 is a computer configured to manage the converged system 2. The management computer 1 has an I/F, a storage device, and a processor coupled to the I/F and the storage device. The I/F is a LAN I/F 16 configured to for communication via the LAN 4. The storage device includes a memory 12 and an auxiliary storage device 14. However, the auxiliary storage device 14 may not be provided. The processor is a CPU 11. The management computer 1 may further has an input device 13 and a monitor 15 serving as an example of a display device. The input device 13 may be a keyboard and a pointing device, for example. A touch panel display may be adopted as the input device 13 and the monitor 15.

The converged system 2 is an example of a computer sub-system. The converged system 2 is a computer sub-system capable of implementing both the virtual server and the virtual storage. A physical resource of the converged system 2 includes, of a plurality of computer devices and a plurality of I/O (Input/Output) devices, at least the plurality of computer devices. The physical resource of the converged system 2 may include a switch device to which the plurality of computer devices and the plurality of I/O devices are coupled. An example of a computer device is the blade 21. An example of an I/O device is the I/O module 24. An example of a switch device is a network switch 23. Communication between the blades 21 and communication between the blade 21 and the I/O module 24 are performed in accordance with an identical communication protocol. Specifically, for example, each blade 21, each I/O module 24, and the network switch 23 may be coupled to a PCIe (PCI Express) bus, and communication between the blades 21 and communication between the blade 21 and the I/O module 24 may be performed in accordance with the PCIe. Such communications may be performed via the network switch (e.g. a PCIe switch) 23.

The converged system 2 has cache memories (hereinafter, caches) 22. The caches 22 may be included in the physical resource. The caches 22 temporarily store data for I/O (e.g. data for I/O to and from an online VOL). The cache 22 may be coupled to the network switch 23. Communication between constituent elements in the converged system 2 (specifically, communication between constituent elements coupled to the network switch 23) may be performed in accordance with an identical protocol (e.g. PCIe). The converged system 2 has a LAN I/F 25 coupled to the management computer 1. The LAN I/F 25 may be coupled to at least one blade 21. That is, the management computer 1 may set information for each blade 21, or the management computer 1 may set information for a master blade 21M and the master blade 21 may set the set information or information based on the set information for each of the other blades 21. In the embodiment, one blade (hereinafter, master blade) 21M is coupled to the management computer 1 via the LAN I/F 25.

The I/O module 24 is a device (e.g. a circuit) configured for I/O of data, and may be an I/F or a storage device, for example. Specifically, for example, the I/O module 24 may include an I/F (e.g. a PCIe card) configured for communication with other constituent elements in the converged system 2 and an I/F configured for communication with an apparatus that is external to the converged system 2 (e.g. an SAS (Serial Attached SCSI) I/F or an FC (Fibre Channel) I/F). The I/F may include a network I/F for communication via a communication network and an SAS-I/F for communication according to the SAS. The I/O module may be a non-volatile storage device such as a flash memory device (hereinafter, an FM device) 24a. The FM device 24a may be an SSD (Solid State Drive), for example. The flash memory possessed by the FM device 24a may be a memory of a recordable type with a limited number of erasure (writing) times such as a NAND flash memory, for example. The term "recordable type" as used herein means that data may not be written into an area (page) in which data have been written before the data are erased. The flash memory is composed of a plurality of blocks, for example. Each block is composed of a plurality of pages. Writing and reading may be performed in units of pages. Erasure may be performed in units of blocks.

For example, the expansion enclosure 3 may be coupled to at least one I/O module 24. The expansion enclosure 3 may include a plurality of PDEVs (physical storage devices). The plurality of PDEVs may be a plurality of HDDs (Hard Disk Drives) 31, for example. A PDEV of other types (e.g. an SSD) may be adopted in place of at least one HDD.

A plurality of RAID groups may be formed in the converged system 2. The RAID groups may be composed of the plurality of I/O modules 24 as a plurality of PDEVs, or may be composed of the plurality of PDEVs in the expansion enclosure 3. The I/O modules 24 and the PDEVs in the expansion enclosure 3 may be present in a mixed manner in one RAID group.

The physical resource of the blade 21 may be assigned to either of the virtual server and the virtual CTL. That is, the blade 21 is a general-purpose device (e.g. a circuit) usable for both the virtual server and the virtual CTL. Each blade 21 can implement the virtual server, implement the virtual CTL, implement the virtual CTL in addition to or in place of the virtual server, and implement the virtual server in addition to or in place of the virtual CTL. In the following description, the blade implementing the virtual server is occasionally referred to as a "server blade", and the blade implementing the virtual CTL is occasionally referred to as a "storage blade". As described above, one blade may have both the virtual server and the virtual CTL at the same time. Thus, one blade may be a server blade and storage blade.

All or a part of the physical source of the one or more blades 21 is assigned to one virtual server. For one virtual storage, all or a part of the physical resource of the one or more blades 21, all or a part of the cache 22, and all or a part of the one or more I/Fs (one or more I/O modules 24) may be assigned to one virtual CTL, and all or a part of the one or more PDEVs (at least one of the one or more I/O modules 24 and the one or more PDEVs in the expansion enclosure 3) may be assigned to one or a plurality of virtual PDEVs.

In the converged system 2, each of the one or more virtual storages may provide a VOL to the one or more virtual servers. A first virtual server transmits a first I/O command designating a first VOL. The first I/O command reaches a first virtual CTL providing the first VOL by way of the network switch 23. The first virtual CTL specifies a PDEV assigned to a virtual PDEV on which an I/O-target area in the first VOL is based, and transmits a second I/O command for I/O to and from a PDEV on which an I/O-target area is based to the I/O module 24 serving as the PDEV or the I/O module 24 coupled to the PDEV. The second I/O command reaches the I/O module 24 as the transmission destination by way of the network switch 23. The I/O module 24 performs I/O of data according to the second I/O command. A response to the second I/O command is transmitted from the I/O module 24 as the transmission destination for the second I/O command to the blade 21 implementing the first virtual CTL by way of the network switch 23. A response to the first I/O command is transmitted from the blade 21 implementing the first virtual CTL to the blade 21 implementing the first virtual server by way of the network switch 23. In the process described above, data according to the first I/O command are temporarily stored by the first virtual CTL in an area (an area in the cache 22) on which a virtual cache possessed by the first virtual CTL is based. In the case where the first virtual server and the first virtual CTL are implemented by an identical blade 21, at least one of the first I/O command and the response to the first I/O command may be delivered within the blade 21 not by way of the network switch 23.

Figure 1B:
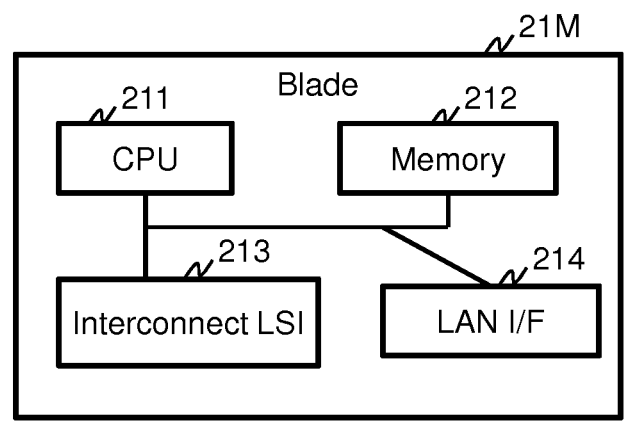
FIG. 1B shows the configuration of a blade 21 (a master blade 21M).

FIG. 1B shows the configuration of the master blade 21M.

The master blade 21M and any of the other blades 21 are a circuit board. The physical resource of the blade 21 includes an I/F, a memory, and a processor coupled to the I/F and the memory. The I/F is a device coupled to the switch 23 such as an interconnect LSI (Large Scale Integration) 213, for example. The processor is a CPU 211, for example. One blade 21 has one or more CPU cores. One CPU 211 has one or a plurality of CPU cores. A plurality of CPUs 211 may be present in one blade 21.

Each blade 21 can perform internal communication (communication with the other blades 21 or communication with the I/O modules 24) by way of the network switch 23 via the interconnect LSI 213. The master blade 21, of the plurality of blades 21, has, as the I/F, a LAN I/F 214 to be coupled to the LAN I/F 25 shown in FIG. 1A. Each blade 21 may have a LAN I/F 214, and may communicate with the management computer 1 through the LAN I/F 214.

Although the configuration of the I/O module 24 is not shown, the I/O module 24 also has an I/F such as the interconnect LSI 213, and can perform internal communication (such as communication with the blades 21) by way of the network switch 23 via the I/F. The I/O module 24 may have an I/F to perform communication through an interface (a protocol) that is different from the PCIe (an interface for internal communication), and may communicate with an apparatus such as a PDEV or a storage apparatus (an apparatus having a plurality of PDEVs) via the I/F.

Figure 2:
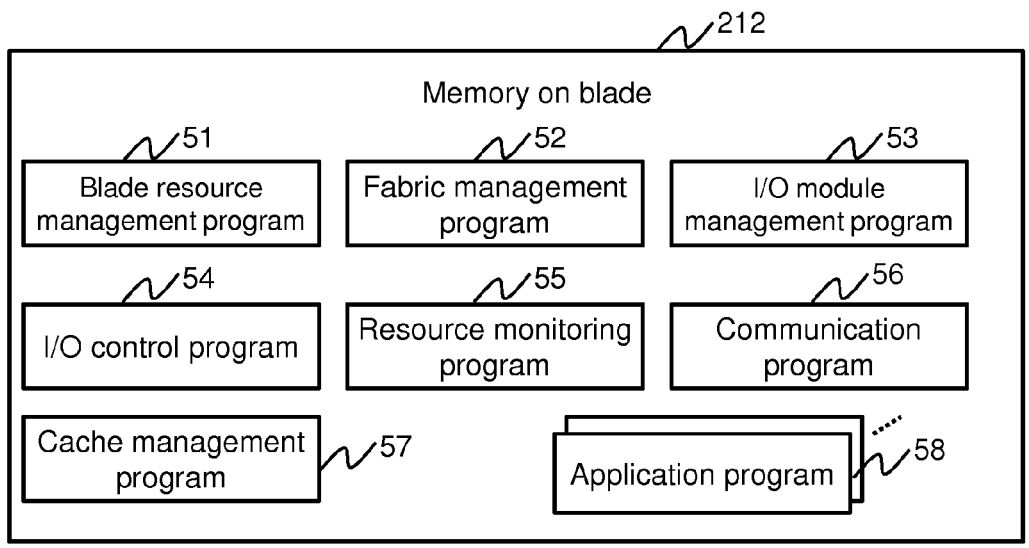
FIG. 2 shows programs stored in a memory 212 of the blade 21.

FIG. 2 shows programs stored in a memory 212 of the blade 21.

The memory 212 stores programs executed by the virtual server and programs executed by the virtual storage so that the blade 21 can serve as both the server blade and the storage blade. Specifically, for example, the memory 212 stores a blade resource management program 51, a fabric management program 52, an I/O module management program 53, an I/O control program 54, a resource monitoring program 55, a communication program 56, a cache management program 57, and an application program 58. There may be a plurality of at least application programs 58. Of the programs 51 to 58, the programs 51, 52, and 55 to 58 may be executed by the server blade, and the programs 51 to 57 may be executed by the storage blade.

The blade resource management program 51 is a program configured to manage assignment of the physical resource of the blade 21, and is a virtualization program such as a hypervisor, for example.

The fabric management program 52 is a program configured to manage a bandwidth (a communication bandwidth) between constituent elements by managing the network switch 23.

The I/O module management program 53 is a program configured to manage the I/O module 24.

The I/O control program 54 is a program configured to control I/O to and from a VOL in accordance with an I/O command designating the VOL.

The resource monitoring program 55 is a program configured to monitor and adjust a load on the bandwidth of a communication network.

The communication program 56 is a program configured to manage a communication protocol and control communication between constituent elements (and communication with an apparatus that is external to the converged system 2).

The cache management program 57 is a program configured to manage a cache area. The cache area may be an area in the cache 22 or the FM device 24a, for example. For example, the cache area may include a plurality of storage areas (hereinafter, slots), and the cache management program 57 may manage the status (dirty, clean, and free) for each slot. A dirty slot is a slot storing dirty data (data that have not been stored in a PDEV based on a writing destination VOL yet). A clean slot is a slot storing clean data (data already stored in a PDEV based on a VOL). A free slot is a slot storing neither the dirty data nor the clean data.

The application program 58 is a program configured to transmit an I/O command designating a VOL. Examples of the application program 58 may include a database management program (DBMS), a program configured to provide a DWH (Data Warehouse), a program configured to provide a BI (Business Intelligence), a program configured to provide a VDI (Virtual Desktop Infrastructure), and a program configured to provide a Web service. The application program 58 may receive a command (e.g. receive a command via a network I/F (one of the I/O modules 24)) from a client apparatus (not shown) (e.g. an external computer communicably coupled to the blade 21 of the converged system 2), perform a process according to the command, and issue an I/O command designating a VOL in the process.

Figure 3:
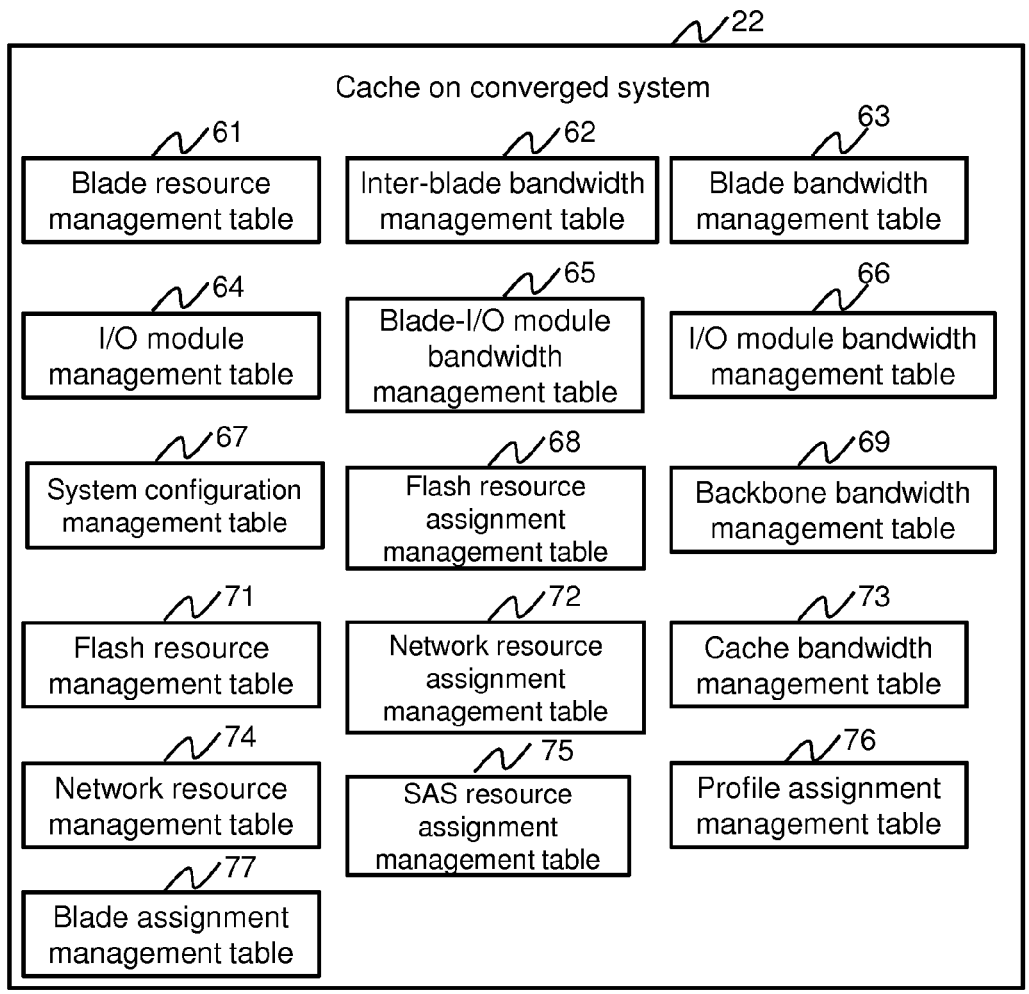
FIG. 3 shows information stored in a cache 22.

FIG. 3 shows information stored in the cache 22.

The cache 22 stores a blade resource management table 61, an inter-blade bandwidth management table 62, a blade bandwidth management table 63, an I/O module management table 64, a blade-I/O module bandwidth management table 65, an I/O module bandwidth management table 66, a system configuration management table 67, a flash resource assignment management table 68, a backbone bandwidth management table 69, a flash resource management table 71, a network resource assignment management table 72, a cache bandwidth management table 73, a network resource management table 74, an SAS resource assignment management table 75, a profile assignment management table 76, and a blade assignment management table 77. Each table will be discussed later. The cache 22 is an area that is common to the plurality of blades 21. Thus, the cache 22 may be the source of the programs 51 to 58 stored in the blades 21. The blade 21 may load a program from the cache 22 as necessary. For example, in the case where the blade 21 serves as the server blade, the blade 21 may load a program necessary for the server blade from the cache 22. The tables 61 to 77 include tables prepared in advance and tables created by performing a process to be discussed later on the basis of a table prepared in advance. Specifically, for example, the tables 62, 65, 68, 72, 75, 76, and 77 may be tables dynamically created on the basis of a table prepared in advance (specifically, tables created in a system configuration setting process (see FIG. 22), for example).

Figure 4:
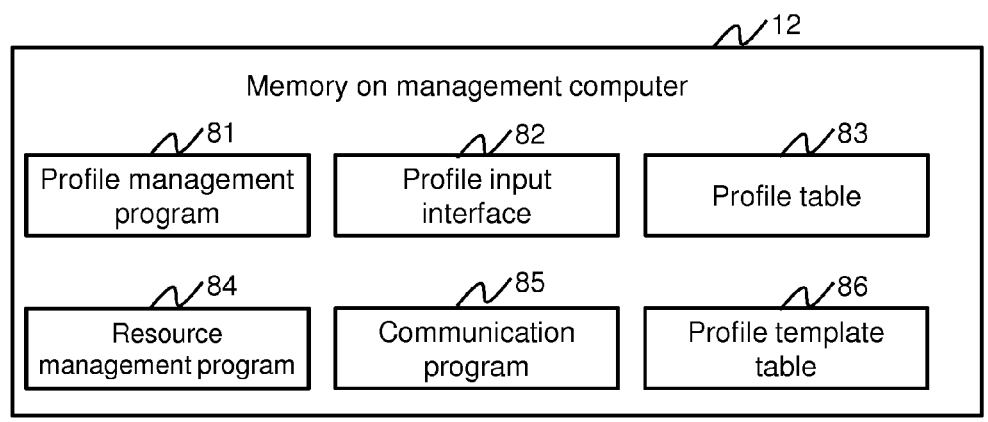
FIG. 4 shows programs and information stored in a memory 12 of a management computer 1.

FIG. 4 shows programs and information stored in the memory 12 of the management computer 1.

The memory 12 has a profile management program 81, a profile input interface 82, a profile table 83, a resource management program 84, a communication program 85, and a profile template table 86.

The profile management program 81 is a program configured to manage a profile.

The profile input interface 82 is a program configured to provide an interface through which input of a profile including a user request is received from a user. The profile indicates an element of the profile table 83, and will be discussed in detail later.

The resource management program 84 is a program configured to manage a resource.

The communication program 85 is a program configured to manage a communication protocol and control communication with the converged system 2.

The profile table 83 and the profile template table 86 will be discussed later.

Each table discussed earlier will be described below.

Figure 5:
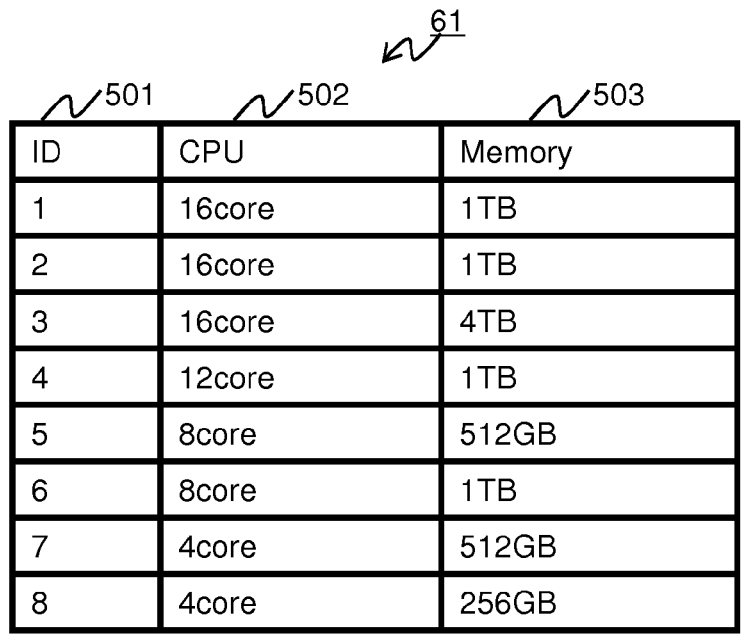
FIG. 5 shows a blade resource management table 61.

FIG. 5 shows the blade resource management table 61.

The blade resource management table 61 is a table configured to manage the specifications of the blades 21. Specifically, for example, the table 61 has the following information for each blade:

an ID 501 serving as the identifier of the blade 21;
a CPU 502 indicating the number of CPU cores possessed by the blade 21; and
a memory 503 indicating the capacity of the memory 212 possessed by the blade 21.

The blade 21 has one or a plurality of CPUs 211. The number of CPU cores indicates the total number of CPU cores possessed by the blade 21. In the illustrated example, the blade with an ID of 1 has 16 CPU cores and a 1-TB memory 212.

Figure 6:
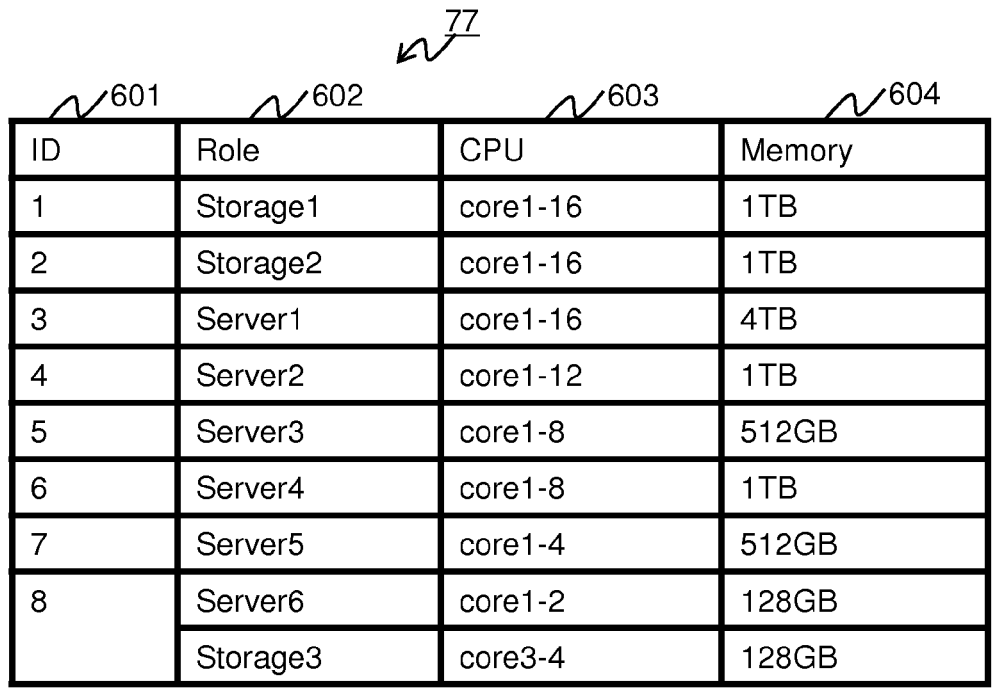
FIG. 6 shows a blade assignment management table 77.

FIG. 6 shows the blade assignment management table 77.

The blade assignment management table 77 is a table configured to manage the role (function) of the blades 21. Specifically, for example, the table 77 has the following information for each blade:

an ID 601 serving as the identifier of the blade 21;
a Role 602 indicating the identifier of the role of the blade 21;
a CPU 603 indicating the ID (identifier) of the CPU core assigned to the role of the blade 21; and
a memory 604 indicating the memory capacity assigned to the role of the blade 21.

The role is roughly divided into a virtual server (Server) and a virtual CTL (Storage), and the role identifiers of the blades 21 with the same type of role do not overlap each other. In other words, the role of the blade 21 corresponds to the type of the virtual machine implemented by the blade 21, and the identifier of the role corresponds to the identifier of the virtual machine. The type of the virtual machine can be identified from the character string in the identifier. Specifically, a virtual machine corresponding to an identifier including "Server" is a virtual server, and a virtual machine corresponding to an identifier including "Storage" is a virtual storage. In the illustrated example, the blade with an ID of 1 functions as a virtual CTL "Storage1", and 16 CPU cores (CPU cores with an ID of 1 to 16) and a memory capacity of 1 TB are assigned to the function of the blade. Meanwhile, a plurality of roles, namely a virtual server "Server6" and a virtual CTL "Storage3", are assigned to the blade with an ID of 8. Of the physical resource of the blade with an ID of 8, 2 CPU cores (CPU cores with an ID of 1 to 2) and a memory capacity of 128 GB are assigned to the virtual server "Server6". Of the physical resource of the blade with an ID of 8, 2 CPU cores (CPU cores with an ID of 3 to 4) and a memory capacity of 128 GB are assigned to the virtual CTL "Storage3".

FIG. 7 shows the profile template table 86.

The profile template table 86 is a table having one or more predefined profile templates usable to update the profile table 83. One profile template corresponds to one record (row) of the profile template table 86. Specifically, for example, the profile template table 86 has the following information for each profile template:

an ID 701 serving as the identifier of the profile template;
a Workload 702 indicating the name of the application corresponding to the profile template;
an I/O characteristic 703 indicating the main I/O characteristic (I/O pattern) of the application corresponding to the profile template;

a capacity 704 indicating the amount of data that can be handled by the application corresponding to the profile template;

a performance request 705 indicating the performance required for the application corresponding to the profile template;

a priority 706 indicating the priority required for the application corresponding to the profile template; and a reliability 707 indicating the reliability required for the application corresponding to the profile template.

In the illustrated example, the profile template with an ID of 1 is a profile template for an application "DB1" (DB is the abbreviation of a database). The application "DB1" mainly performs random read. The application "DB1" requires a storage capacity of 10 TB, a high performance, the highest priority "1", and a high reliability "High". In the embodiment, the performance (typically, I/O performance) for the performance request is divided into three grades, namely high, middle, and low. A predetermined I/O performance may be correlated with each grade. The unit of the performance and the performance (value) correlated with high, middle, and low grades may be different among the types of the applications. For the priority 706, a smaller value indicates a higher priority. In the embodiment, the reliability 707 is also divided into three grades, namely high, middle, and low. At least one of the performance, the priority, and the reliability may be defined otherwise.

FIG. 8 shows the profile table 83.

The profile table 83 is a table having one or more profiles including the user request. One profile corresponds to one record (row) of the profile table 83. Specifically, for example, the profile table 83 has the following information for each profile:

an ID 801 serving as the identifier of the profile;

a Workload 802 indicating the name of the application corresponding to the profile;

an I/O characteristic 803 indicating the main I/O characteristic of the application corresponding to the profile;

a performance 804 required for the application corresponding to the profile;

a capacity 805 indicating the amount of data that can be handled by the application corresponding to the profile;

a time bandwidth 806 indicating the time bandwidth over which the application corresponding to the profile operates;

a priority 807 indicating the priority required for the application corresponding to the profile; and a reliability 808 indicating the reliability required for the application corresponding to the profile.

The time bandwidth 806 may represent a time bandwidth in a certain period (such as one day, one week, or one month, for example). In the illustrated example, the profile with an ID of 1 corresponds to the DBMS "DB1". The DBMS "DB1" performs both random read and random write, and requires a read performance that is higher than the write performance. In addition, the DBMS "DB1" requires a storage capacity of 10 TB, operates from 6:00 to 18:00, has a high priority, and requires a high reliability. The profiles (e.g. information 802 to 808) may be information input from the user. The information 802 to 805, 807, and 808, of the profiles, may be input utilizing the information 702 to 707 in the profile template. If there is an excess or a deficiency of information in the profile template, the user may input a profile desired by the user by adding (e.g. adding the time bandwidth 806), changing, or deleting information as appropriate. The profile includes the user request. The "user request" in the embodiment may be a request including information input by the user by operating the input device 13. For the performance, each of the read and write performances (values) may be associated for each grade of the performance request 705 as shown, and the performances (values) may be reflected in the profile.

FIG. 9 shows the profile assignment management table 76.

The profile assignment management table 76 is a table configured to manage the assignment of a requirement to each profile. Specifically, for example, the profile assignment management table 76 has the following information for each profile:

an ID 901 serving as the identifier of the profile;

a Workload 902 indicating the name of the application corresponding to the profile;

a core requirement 903 indicating the number of CPU cores that are necessary for operation of the application corresponding to the profile;

a bandwidth requirement 904 indicating the bandwidth that is necessary for operation of the application corresponding to the profile;

a capacity 905 indicating the amount of data that can be handled by the application corresponding to the profile; and an assignment 906 indicating the identifier of the blade role (virtual machine) assigned to the application corresponding to the profile.

In the illustrated example, the profile with an ID of 1 corresponds to the DBMS "DB1". The DBMS "DB1" requires eight CPU cores, a bandwidth of 10 GB/s, and a storage capacity of 10 TB. The virtual CTL "Storage1" and the virtual server "Server1" are assigned to the DBMS "DB1".

FIG. 10 shows the I/O module management table 64.

The I/O module management table 64 is a table configured to manage the I/O module 24. Specifically, for example, the table 64 has the following information for each I/O module 24:

an ID 1001 serving as the identifier of the I/O module 24;

a type 1002 indicating the type of the I/O module 24; and a Type-specific ID 1003 serving as the identifier assigned to the I/O modules 24 of the same type.

In the illustrated example, the I/O module 24 with an ID of 1 is an FM device, and a flash ID (Type-specific ID) of "1" has been assigned to the FM device.

FIG. 11 shows the inter-blade bandwidth management table 62.

The inter-blade bandwidth management table 62 is configured to manage a bandwidth between the virtual machines (between the blades). The vertical axis indicates the identifier of the transmission-initiator virtual machine. The horizontal axis indicates the identifier of the transmission-destination virtual machine. The bandwidth between the transmission-initiator virtual machine and the transmission-destination virtual machine is indicated at the intersection (cell). In the illustrated example, the bandwidth for communication from the virtual server "Server1" to the virtual CTL "Storage1" is 10 GB/s.

FIG. 12 shows the blade-I/O module bandwidth management table 65.

The blade-I/O module bandwidth management table 65 is configured to manage a bandwidth between the virtual machine (the blade 21) and the I/O module 24. The vertical axis indicates the identifier of the transmission-initiator virtual machine. The horizontal axis indicates the identifier of the transmission-destination I/O module 24. The bandwidth between the transmission-initiator virtual machine (blade 21) and the transmission-destination I/O module 24 is indicated at the intersection (cell). In the illustrated example, the bandwidth for communication from the virtual CTL "Storage1" to the I/O module "I/O 1" is 2 GB/s. No communication is performed between elements corresponding to an intersection with a "-" symbol (hereinafter, an enable cell). Specifically, the enable cell means that no I/O module corresponding to the enable cell is assigned to the virtual machine corresponding to the enable cell.

Figure 13:
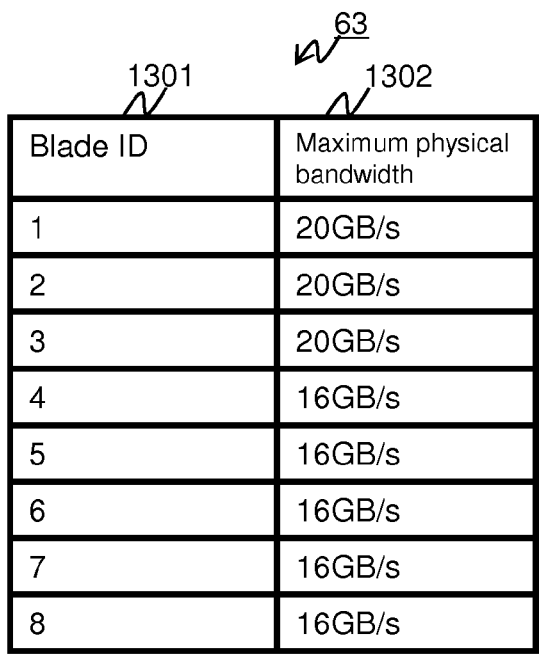
FIG. 13 shows a blade bandwidth management table 63.

FIG. 13 shows the blade bandwidth management table 63.

The blade bandwidth management table 63 is a table configured to manage a bandwidth between the network switch 23 and the blade 21. Specifically, for example, the table 63 has the following information for each blade:
- an ID 1301 serving as the identifier of the blade 21; and
- a maximum physical bandwidth 1302 indicating the maximum value of the physical bandwidth between the blade 21 and the network switch 23.

In the illustrated example, the maximum physical bandwidth between the blade with an ID of 1 and the network switch 23 is 20 GB/s.

Figure 14:
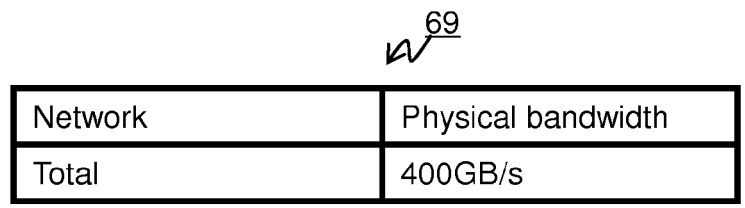
FIG. 14 shows a backbone bandwidth management table 69.

FIG. 14 shows the backbone bandwidth management table 69.

The backbone bandwidth management table 69 is a table configured to manage a bandwidth peculiar to the network switch 23. In the illustrated example, the physical bandwidth of the network switch is 400 GB/s.

Figure 15:
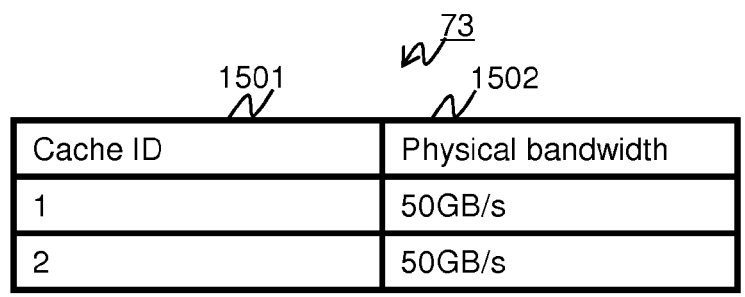
FIG. 15 shows a cache bandwidth management table 73.

FIG. 15 shows the cache bandwidth management table 73.

The cache bandwidth management table 73 is a table configured to manage a bandwidth between the cache 22 and the network switch 23. Specifically, for example, the table 73 has the following information for each cache:
- an ID 1501 serving as the identifier of the cache; and
- a physical bandwidth 1502 indicating the physical bandwidth between the cache 22 and the network switch 23.

In the illustrated example, the physical bandwidth of the cache with an ID of 1 is 50 GB/s.

Figure 16:
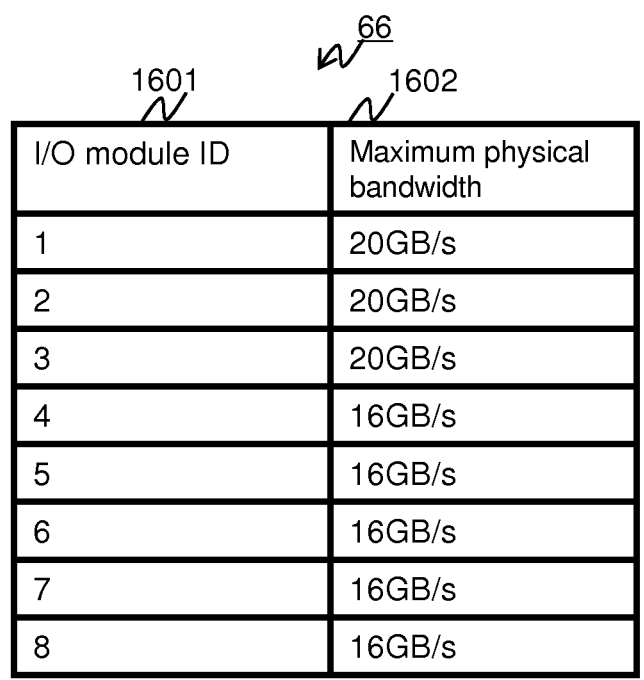
FIG. 16 shows an I/O module bandwidth management table 66.

FIG. 16 shows the I/O module bandwidth management table 66.

The I/O module bandwidth management table 66 is a table configured to manage a bandwidth between the network switch 23 and the I/O module 24. Specifically, for example, the table 66 has the following information:
- an ID 1601 serving as the identifier of the I/O module 24; and
- a maximum physical bandwidth 1602 indicating the maximum value of the physical bandwidth between the network switch 23 and the I/O module 24.

In the illustrated example, the maximum physical bandwidth of the I/O module with an ID of 1 is 20 GB/s.

Figure 17:
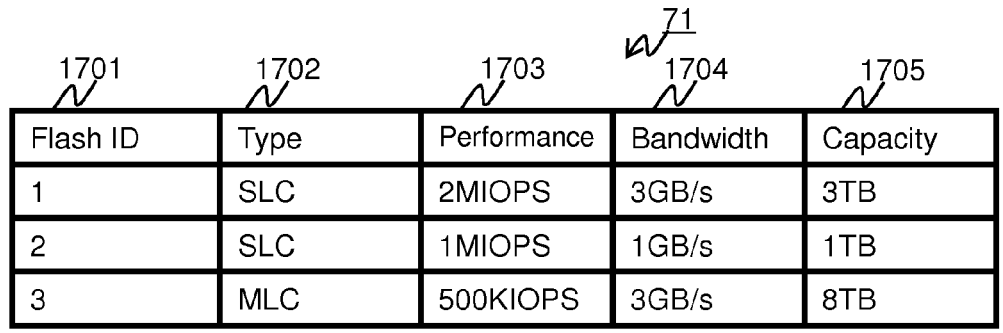
FIG. 17 shows a flash resource management table 71.

FIG. 17 shows the flash resource management table 71.

The FM device is one of the I/O modules 24. The flash resource management table 71 is a table configured to manage the specifications of the FM devices. Specifically, for example, the table 71 has the following information for each FM device:
- a flash ID 1701 serving as the identifier of the FM device;
- a Type 1702 indicating the recording scheme of the FM device;
- a performance 1703 indicating the I/O performance of the FM device;
- a bandwidth 1704 indicating the bandwidth of the FM device; and
- a capacity 1705 indicating the storage capacity of the FM device. The flash ID 1701 corresponds to the Type-specific ID 1003 in the table 64 shown in FIG. 10. For the Type 1702, "SLC" means an SLC (Single Level Cell) scheme, and "MLC" means an MLC (Multi Level Cell) scheme. In the illustrated example, the FM device with an ID of 1 stores data using the SLC scheme, and has a performance of 2 M IOPS, a bandwidth of 3 GB/s, and a storage capacity of 3 TB.

Figure 18:
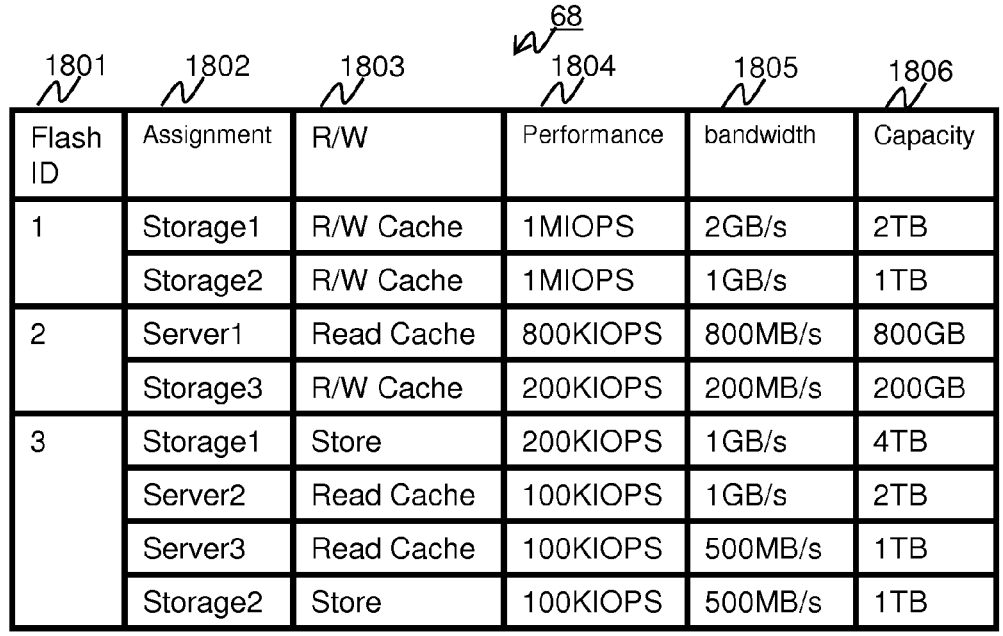
FIG. 18 shows a flash resource assignment management table 68.

FIG. 18 shows the flash resource assignment management table 68.

The flash resource assignment management table 68 is a table configured to manage the assignment of the FM devices to the virtual machines. Specifically, for example, the table 68 has the following information for each storage area range (e.g. logical area range) of the FM devices:
- a flash ID 1801 serving as the identifier of the FM device providing the storage area range;
- an assignment 1802 indicating the identifier of the virtual machine (role) assigned to the storage area range;
- an R/W 1803 indicating the usage of the storage area range;
- a performance 1804 indicating the I/O performance of the storage area range;
- a 1805 indicating the bandwidth of the storage area range; and
- a capacity 1806 indicating the storage capacity of the storage area range.

The flash ID 1801 corresponds to the Type-specific ID 1003 in the table 64 shown in FIG. 10. For the R/W 1803, "R/W Cache" means that data are both read from and written into the storage area range, "Read Cache" means that data are read from but not written into the storage area range, and "Store" means that the storage area range is used as a part or all of the final storage device. For example, an area corresponding to "Store" may be a storage area on which the RVOL is based. In the illustrated example, for the FM device with an ID of 2, a first storage area range is used for the virtual server "Server1" as a read cache (an area range that may be used in processing a read command but that is not used in processing a write command), and a second storage area range is used for the virtual CTL "Storage3" as a read/write cache (an area range that may be used both in processing a read command and in processing a write command).

Figure 19:
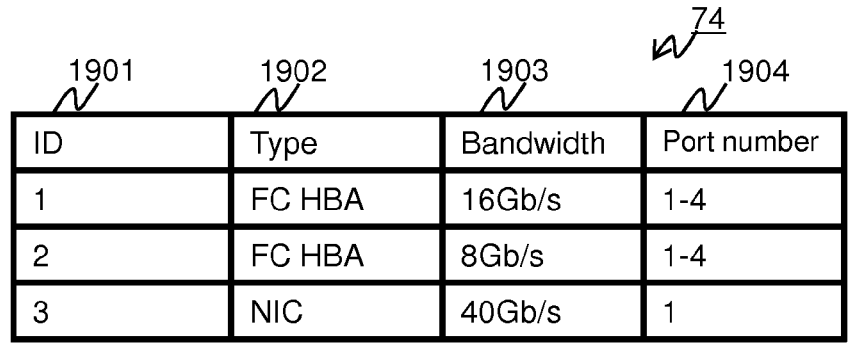
FIG. 19 shows a network resource management table 74.

FIG. 19 shows the network resource management table 74.

The I/F (in particular, the network I/F configured to communicate with an apparatus that is external to the converged system 2) is one of the I/O modules 24. The network resource management table 74 is a table configured to manage the specifications of the I/Fs. Specifically, for example, the table 74 has the following information for each I/F:
- an ID 1901 serving as the identifier of the I/F;
- a Type 1902 indicating the type of the I/F;
- a bandwidth 1903 indicating the bandwidth between the I/F and an external device (e.g. a device that is external to the converged system 2 such as the HDD 31); and
- a Port number 1904 indicating the numbers of the ports possessed by the I/F.

The ID 1901 corresponds to the Type-specific ID 1003 in the table 64 shown in FIG. 10. In the illustrated example, the I/F with an ID of 1 is an FC HBA (Host Bus Adapter) as an example of the FC I/F, and has a bandwidth between the I/F and an external device of 16 Gb/s and four ports with port numbers 1 to 4.

Figure 20:
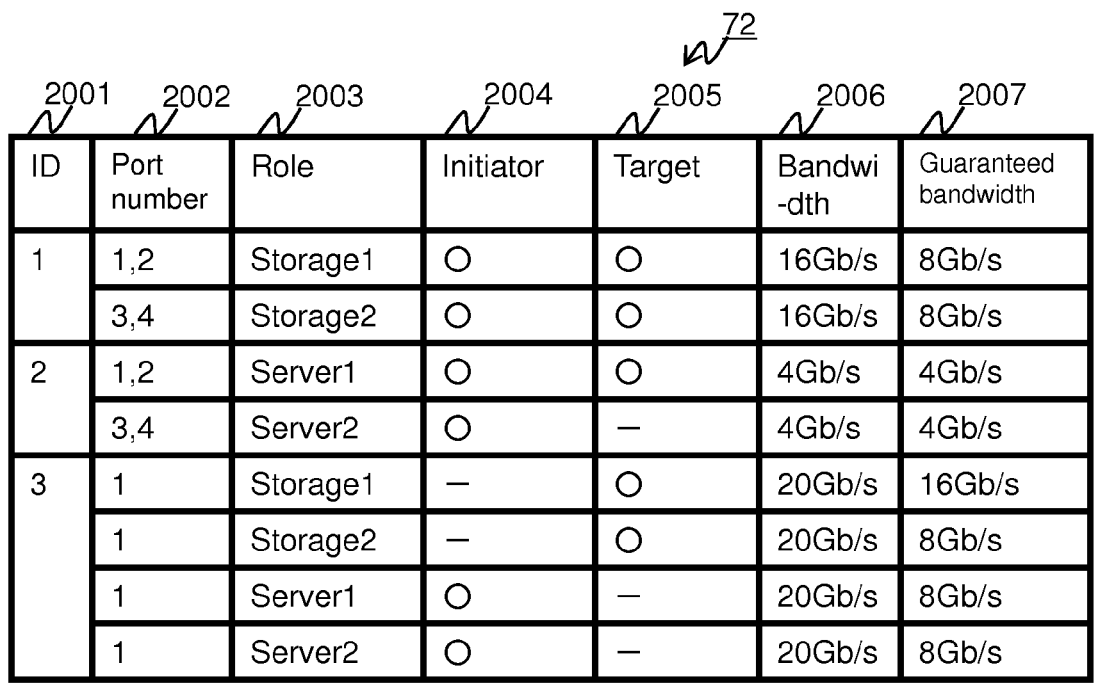
FIG. 20 shows a network resource assignment management table 72.

FIG. 20 shows the network resource assignment management table 72.

The network resource assignment management table 72 is a table configured to manage the assignment of the virtual machines to the I/Fs. Specifically, for example, the table 72 has the following information for each I/F:

- an ID 2001 serving as the identifier of the I/F;
- a Port number 2002 corresponding to the numbers of the ports possessed by the I/F;
- a Role 2003 indicating the identifier of the virtual machine (role) assigned to the port possessed by the I/F;
- an Initiator 2004 indicating whether or not the virtual machine may be a transmission initiator;
- a Target 2005 indicating whether or not the virtual machine may be a transmission destination;
- a bandwidth 2006 indicating the bandwidth between the virtual machine and an external device; and
- a guaranteed bandwidth 2007 indicating a guaranteed bandwidth of the bandwidth.

The ID 2001 corresponds to the Type-specific ID 1003 in the table 64 shown in FIG. 10. A plurality of different virtual machines can use one port possessed by the I/F. In the illustrated example, the ports "1" and "2" of the I/F with an ID of 1 are used by the virtual CTL "Storage1", and may be both a transmission initiator and a transmission destination.

FIG. 21 shows the SAS resource assignment management table 75.

Examples of the I/F include an SAS-I/F configured to communicate with an external apparatus (an apparatus that is external to the converged system 2) configured to communicate in accordance with the SAS. The SAS resource assignment management table 75 is a table configured to manage the assignment of the SAS-I/F. Specifically, for example, the table 75 has the following information for each SAS-I/F:

- an SAS ID 2101 serving as the identifier of the SAS-I/F;
- an assignment 2102 indicating the identifier of the virtual machine assigned to the SAS-I/F; and
- a bandwidth 2103 indicating the bandwidth between the virtual machine assigned to the SAS-I/F and an external apparatus. The ID 2101 corresponds to the Type-specific ID 1003 in the table 64 shown in FIG. 10. In the illustrated example, the virtual CTL "Storage1" is assigned to the SAS-I/F with an ID of 1.

The tables possessed by the blades 21 and the management computer 1 have been described above. In the embodiment, tables are dynamically created on the basis of tables prepared in advance, of the tables discussed earlier, and a user request input to the management computer 1, and the virtual machine to be assigned to the profile (application profile) is decided on the basis of the created tables.

Processes performed in the embodiment will be described below.

Figure 22:
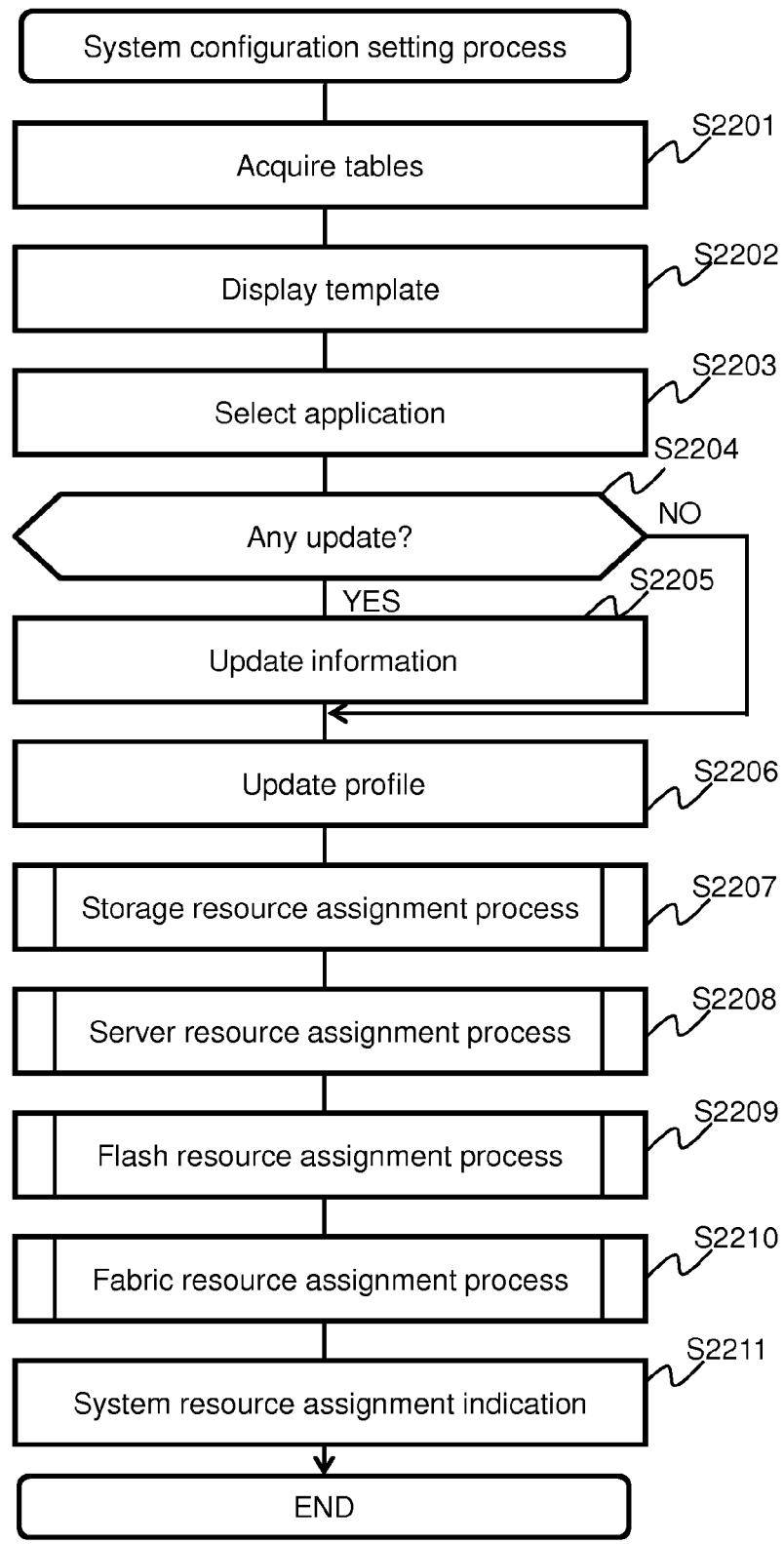
FIG. 22 is a flowchart of a system configuration setting process.

FIG. 22 is a flowchart of the system configuration setting process.

The system configuration setting process is a process configured to define the configuration of the converged system 2. The process is performed in at least one of the case where a new user request is input and the case where a configuration change is made to the physical resource of the converged system 2 (such as an addition or a removal of a blade 21 and an addition or a removal of an I/O module 24, for example). The configuration change to the physical resource of the converged system 2 may be detected on the basis of an update of the blade resource management table 61 or the like performed via the resource management program 84, or the resource management program 84 receiving a notification of an addition or a removal of a blade 21 or the like from the resource monitoring program 55 for the blade 21, for example.

In S2201, the profile management program 81 acquires information possessed by the tables that are necessary to define the configuration of the converged system 2 from the cache 22 of the converged system 2, and writes the information into the memory 12. Specifically, for example, the profile management program 81 transmits an information acquisition request to a program (e.g. the resource monitoring program 55) for a blade 21. Upon receiving the request, the program acquires information possessed by the tables that are necessary to define the configuration of the converged system 2 from the cache 22, and transmits the acquired information to the profile management program 81. Examples of the "tables that are necessary to define the configuration of the converged system 2" include the tables 61, 63 to 64, 66, 69, 71, 73, and 74.

In S2202, the profile management program 81 invokes the profile input interface 82. The profile input interface 82 displays, on the monitor 15, a GUI (Graphical User Interface) including a user request input template (hereinafter, an input template) based on the profile template table 86. The input template may include a list of all the profile templates possessed by the template table 86. The input template may also include a list of all the profiles possessed by the profile table 83. The GUI of the input template can accept selection of a profile template (or a profile) desired by the user from a plurality of profile templates (or a plurality of profiles), and editing of the selected profile template (or profile).

In S2203, the profile input interface 82 accepts selection of an application (Workload) desired by the user, from among the input templates, from the input device 13.

In S2204, the profile input interface 82 determines whether or not information associated with the selected application (information included in the profile template or the profile corresponding to the selected application) is updated (added, changed, or deleted). Specifically, for example, the profile input interface 82 determines whether or not a predetermined button on the GUI of the input template has been pressed.

If the result of the determination in S2204 is true (S2204: YES), in S2205, the profile input interface 82 accepts an update of the information associated with the selected application (information included in the profile template or the profile corresponding to the selected application).

In S2206, the profile management program 81 updates the profile table 83. For example, the profile management program 81 may update the profile in the profile table 83 in accordance with the update performed in S2205. Alternatively, the profile management program 81 may add a profile according to the update of the profile template or the profile corresponding to the selected application to the profile table 83. Alternatively, the profile management program 81 may add a profile according to the profile template corresponding to the selected application to the profile table 83 in S2206 following S2204 in which the result of the determination is false (S2204: NO). Information included in the profile template or the profile after being updated in S2205 or information included in the profile template corresponding to the application selected in S2203 may correspond to the user request in the embodiment. That is, the user request may include one or a plurality of requests corresponding to one or a plurality of request items, respectively, for the selected application. Examples of the request items include at least one of the I/O characteristic, the amount of data handled, the performance, the time bandwidth of operation, the priority, and the reliability as shown in FIG. 7 and FIG. 8.

Figure 23A:
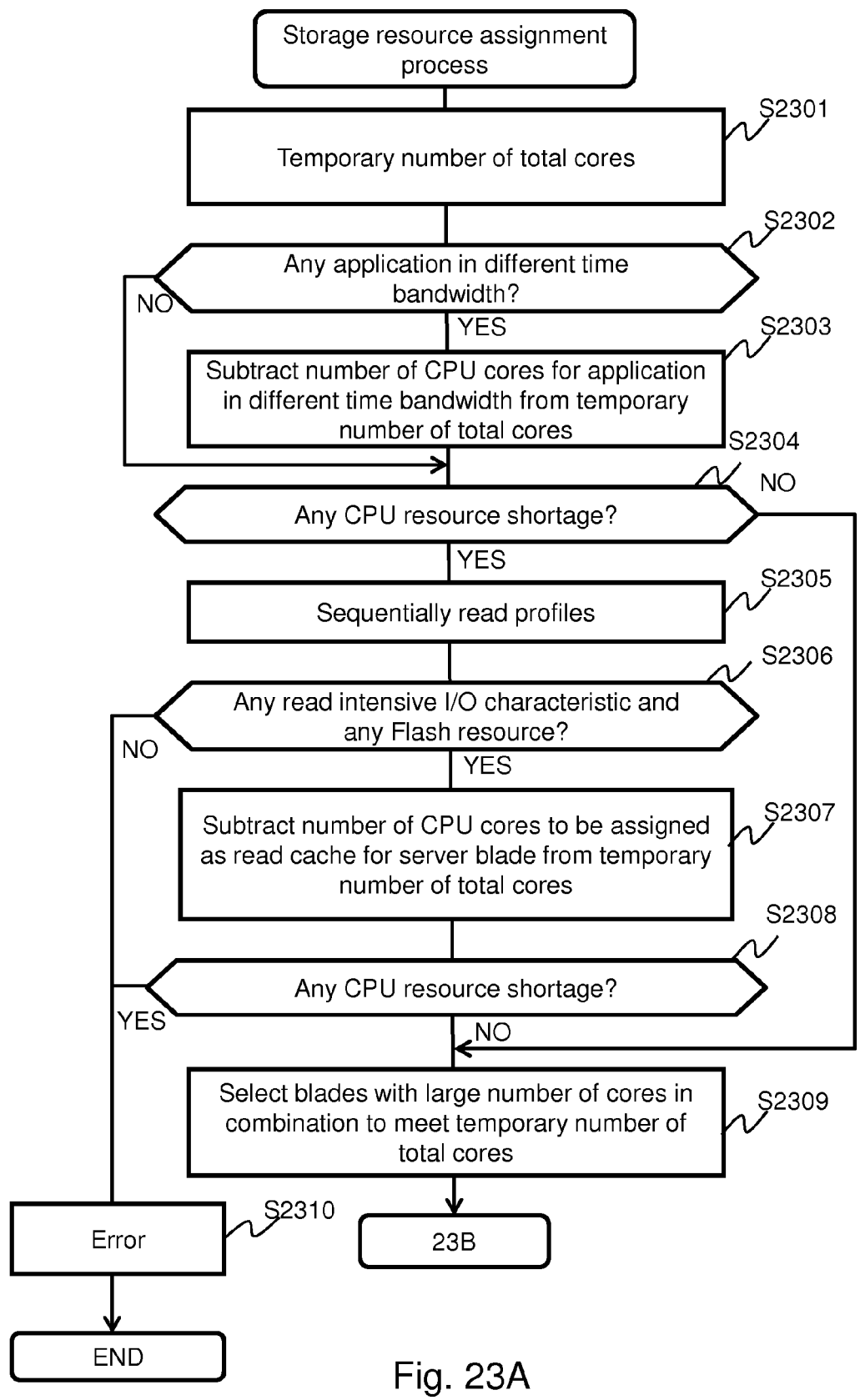
FIG. 23A shows a part of a flowchart of a storage resource assignment process.
Figure 23B:
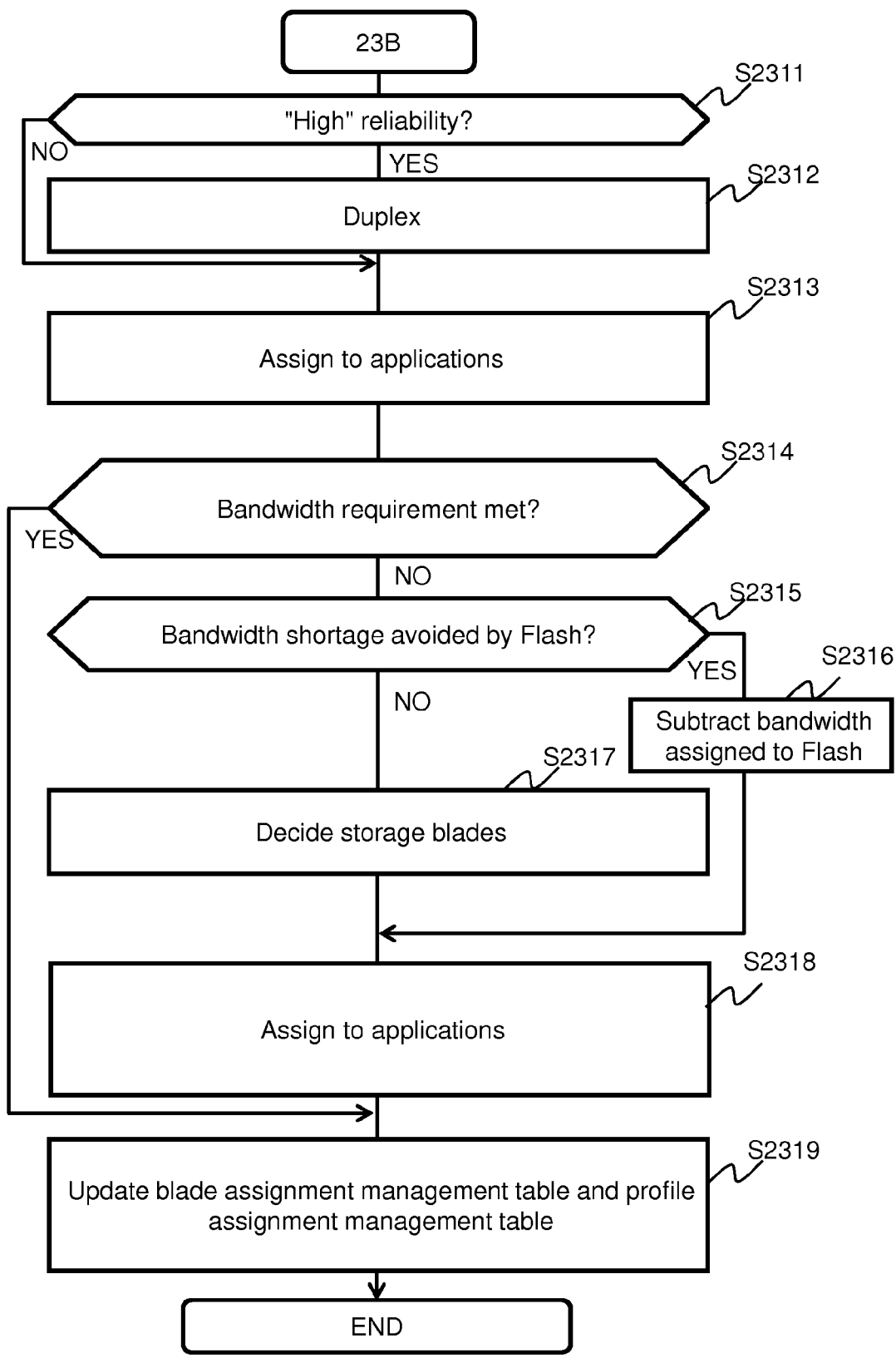
FIG. 23B shows the remainder of the flowchart of the storage resource assignment process.

In S2207, the profile management program 81 performs a storage resource assignment process (FIG. 23A and FIG. 23B).

Figure 24A:
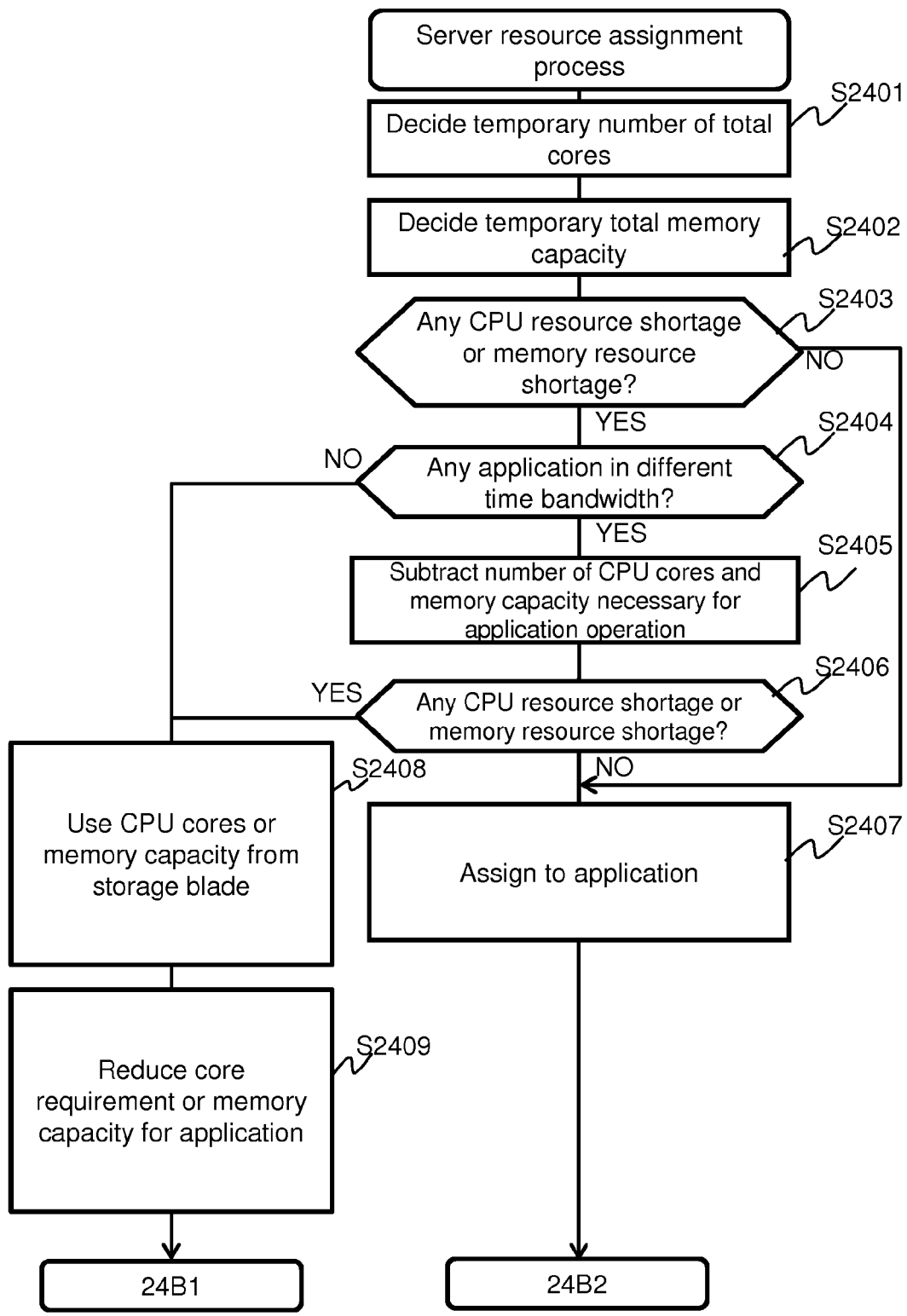
FIG. 24A shows a part of a flowchart of a server resource assignment process.
Figure 24B:
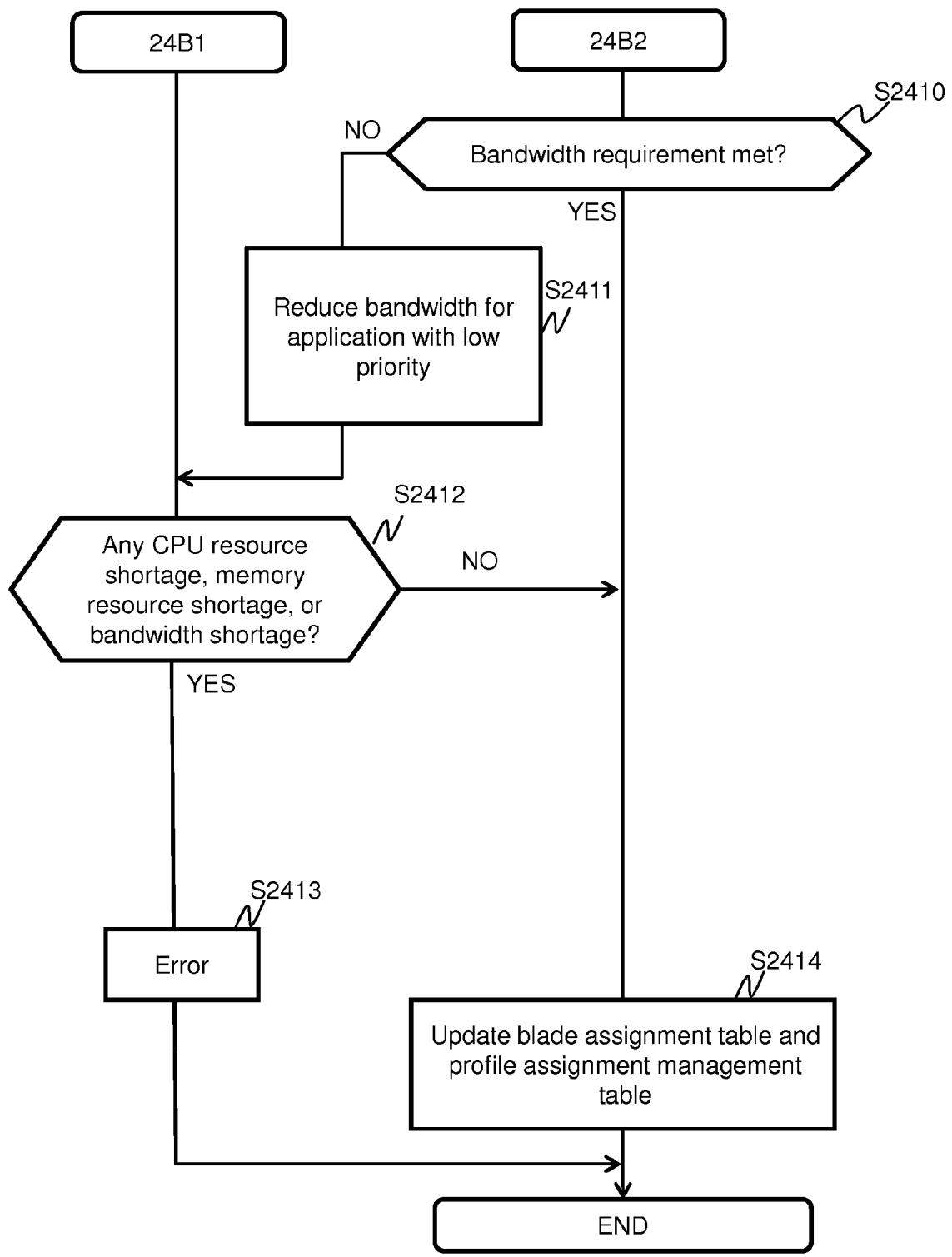
FIG. 24B shows the remainder of the flowchart of the server resource assignment process.

In S2208, the profile management program 81 performs a server resource assignment process (FIG. 24A and FIG. 24B).

Figure 25A:
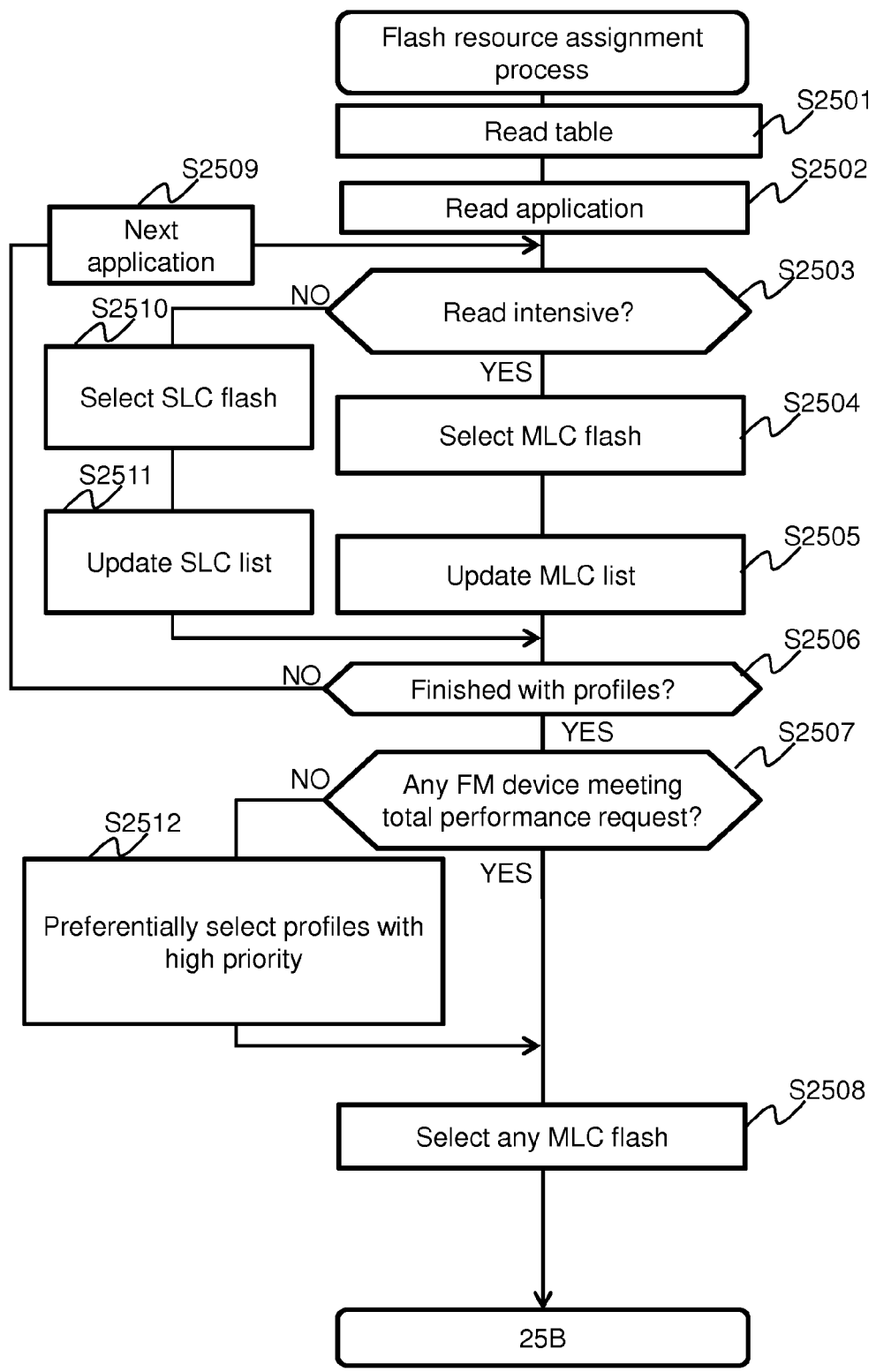
FIG. 25A shows a first part of a flowchart of a flash resource assignment process.
Figure 25B:
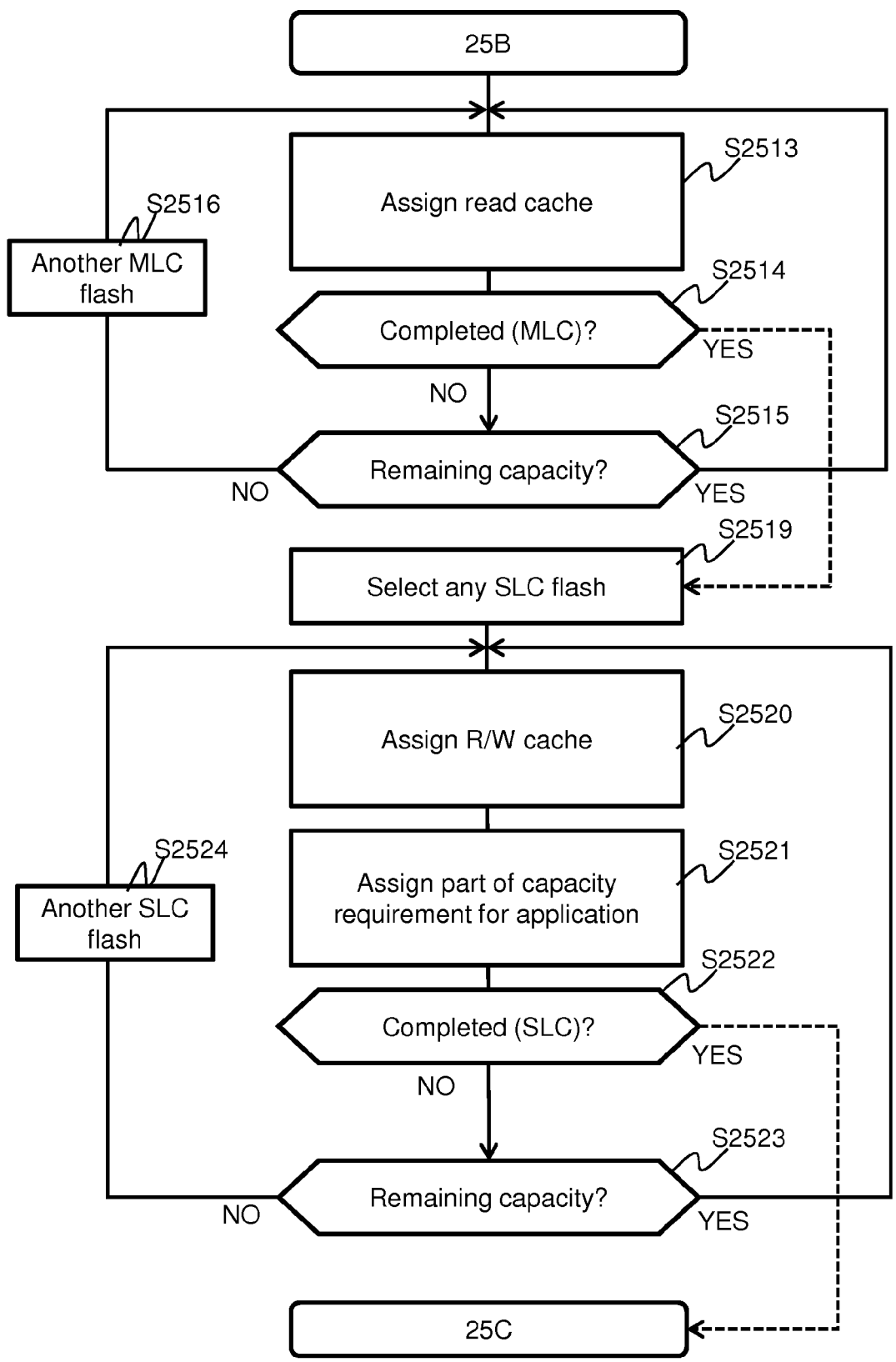
FIG. 25B shows a second part of the flowchart of the flash resource assignment process.
Figure 25C:
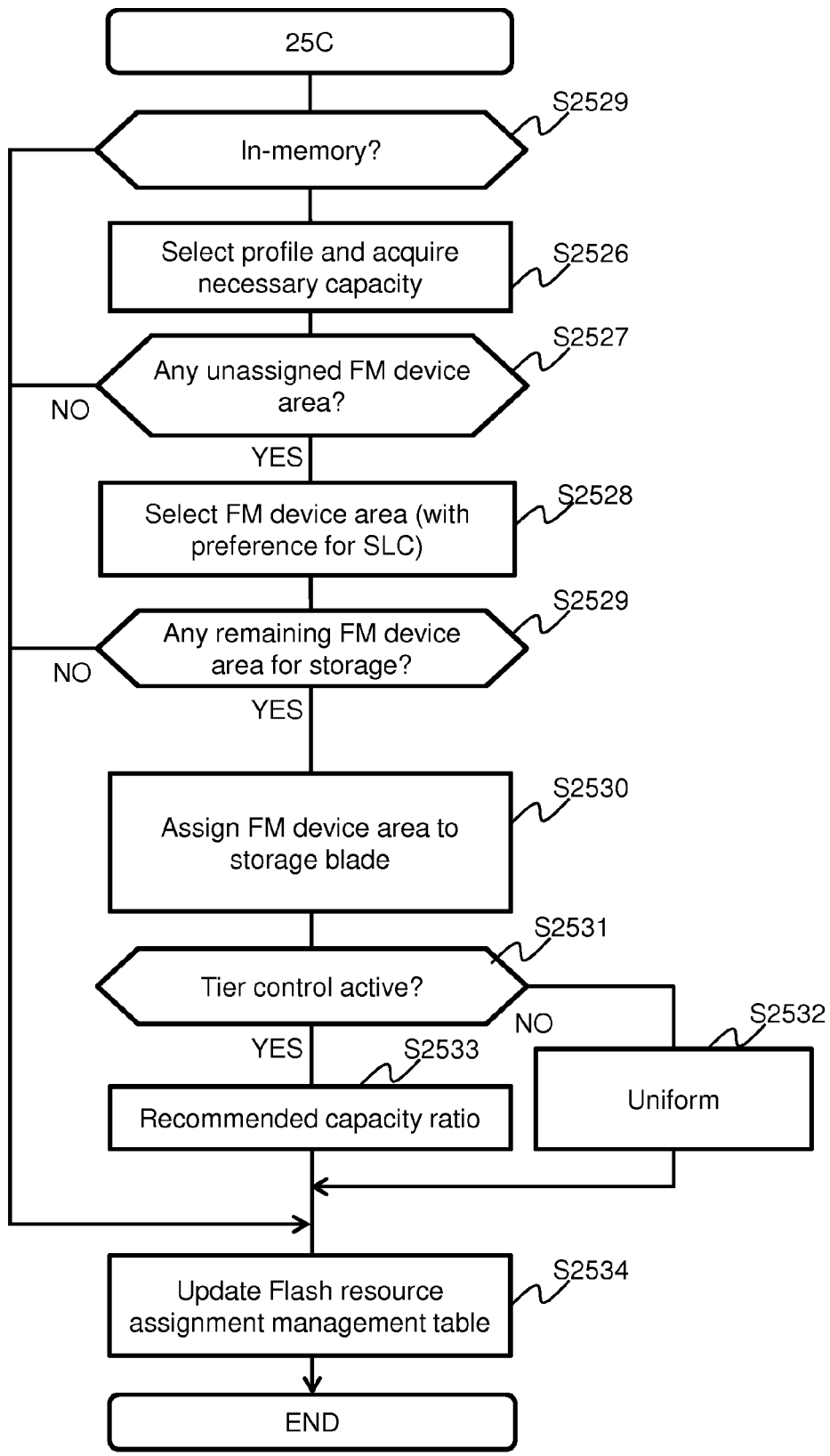
FIG. 25C shows the remainder of the flowchart of the flash resource assignment process.

In S2209, the profile management program 81 performs a flash resource assignment process (FIG. 25A to FIG. 25C).

Figure 26:
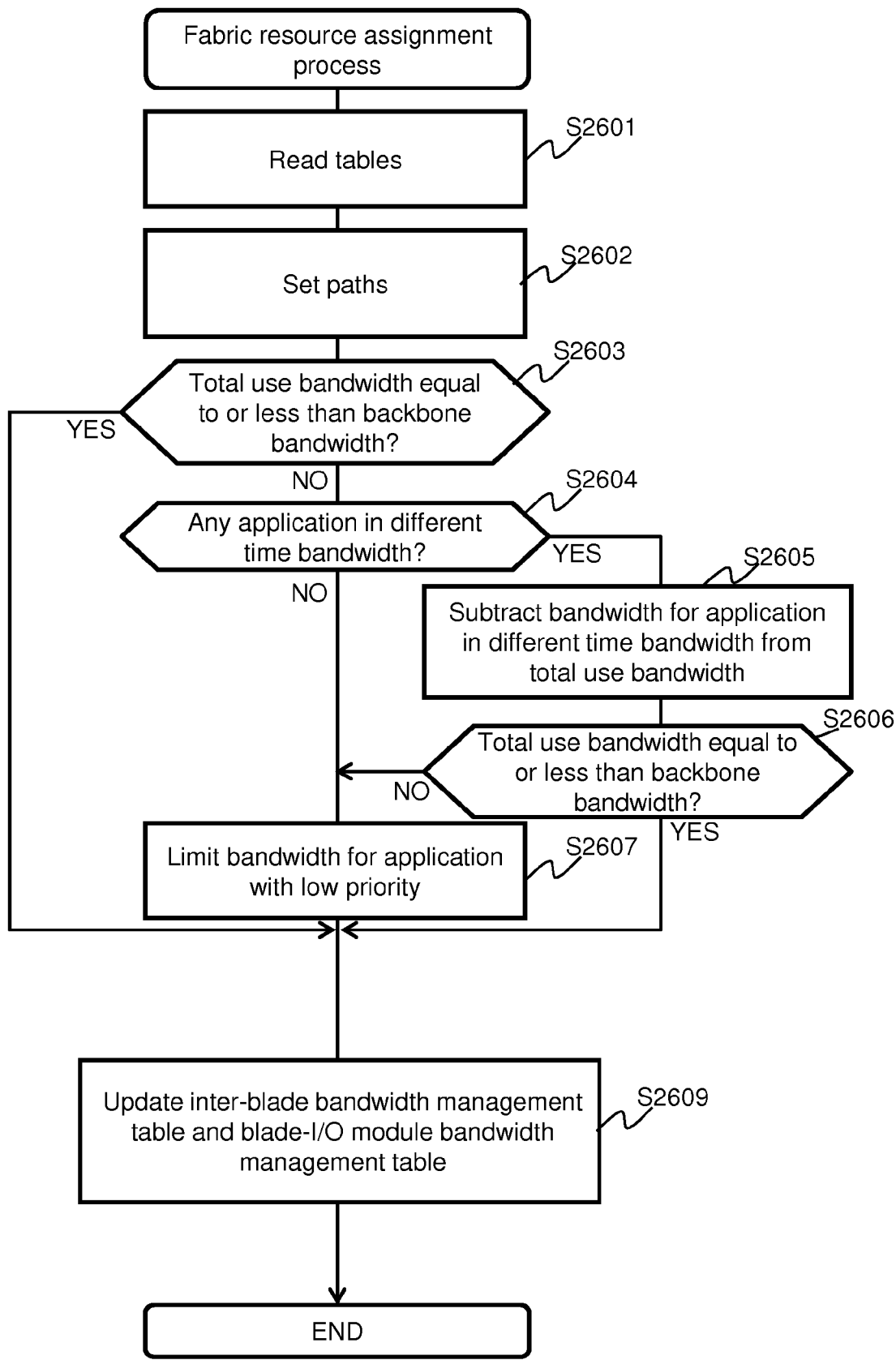
FIG. 26 is a flowchart of a fabric resource assignment process.

In S2210, the profile management program 81 performs a fabric resource assignment process (FIG. 26).

In S2211, the profile management program 81 transmits a system resource assignment indication to the converged system 2 (e.g. a blade 21). The converged system 2 (a blade 21) receives the system resource assignment indication, and assigns a system resource in accordance with the indication, that is, constructs a logical configuration according to the tables 62, 65, 68, 72, 75, 76, and 77 created in S2207 to S2210.

The system configuration setting process allows a logical configuration that meets a user request as much as possible to be constructed without the user grasping the details of the physical configuration of the converged system 2 (such as the number of blades, the specifications of each blade, the number of I/O modules, and the specifications of each I/O module, for example) or making detailed settings for meeting the user request (e.g. deciding a virtual machine to be assigned to an application and a physical resource portion to be assigned to the virtual machine).

FIG. 23A and FIG. 23B show a flowchart of the storage resource assignment process.

In S2301, the profile management program 81 decides the number of CPU cores that are necessary to meet the performance 804 in the profile table 83. The number of cores is a temporary number of cores, and therefore hereinafter referred to as a "temporary number of total cores". Specifically, for example, the profile management program 81 calculates the total of the performances 804 in all the profiles possessed by the profile table 83, and calculates the temporary number of total cores on the basis of the total. In the embodiment, it is assumed that the CPU cores of all the blades 21 have the same performance, and that the memory of the management computer 1 stores information representing the performance of one CPU core (hereinafter, "one-core performance"). The temporary number of total cores can be calculated by dividing the total described above by the one-core performance. The profile management program 81 also calculates, for each profile, the number of CPU cores (hereinafter, "number of sub-cores") that are necessary to demonstrate the performance 804 in the profile.

In S2302, the profile management program 81 references all the time bandwidths 806 in the profile table 83, and determines whether or not there is an application corresponding to a time bandwidth 806 that is different from any other time bandwidth 806. The time bandwidth 806 that is different from any other time bandwidth 806 may indicate a time bandwidth 806 that does not entirely overlap any other time bandwidth 806, and may preferably indicate a time bandwidth 806 that does not even partially overlap any other time bandwidth 806. In the case where the result of the determination in S2302 is true (S2302: YES), S2303 is performed. In the case where the result of the determination in S2302 is false (S2302: NO), S2304 is performed.

In S2303, the profile management program 81 updates the temporary number of total cores on the basis of the number of sub-cores corresponding to the profile including the time bandwidth 806 that is different from any other time bandwidth 806. Specifically, the profile management program 81 subtracts the number of sub-cores corresponding to the profile including the time bandwidth 806 that is different from any other time bandwidth 806 from the temporary number of total cores.

In S2304, the profile management program 81 determines whether or not there is a shortage in CPU resource. This is a determination as to whether or not the number of CPU cores possessed by the converged system 2 is less than the temporary number of total cores. Specifically, for example, the profile management program 81 determines whether or not the sum of the CPUs 502 in the blade resource management table 61 is less than the temporary number of total cores. In the case where the result of the determination in S2304 is false (S2304: NO), S2305 is performed. In the case where the result of the determination in S2304 is true (S2304: YES), S2309 is performed.

In S2305, the profile management program 81 sequentially reads information on the profiles from the top of the profile table 83.

In S2306, the profile management program 81 determines whether or not there is a read intensive I/O characteristic 803 and whether or not there is an FM device 24a in the converged system 2. The read intensive I/O characteristic 803 indicates an I/O characteristic 803 not including information related to write (e.g. RW) but including only information related to read (e.g. RndRD or SeqRD). Whether or not there is an FM device 24a corresponds to whether or not there is a "Flash" as the Type 1002 in the I/O module management table 64. In the case where the result of the determination in S2306 is false (S2306: NO), S2310 is performed. In the case where the result of the determination in S2306 is true (S2306: YES), S2307 is performed.

In S2307, the profile management program 81 updates the temporary number of total cores on the basis of the number of CPU cores based on the performance 804 of a read intensive application. The term "read intensive application" indicates an application corresponding to a profile including the read intensive I/O characteristic 803. A cache area (read cache) for a virtual server configured to execute the read intensive application is assigned from the FM device 24a. In S2307, for example, the profile management program 81 subtracts the number of sub-cores according to the performance 804 of the read intensive application from the temporary number of total cores. Consequently, it is expected that the read performance of the virtual server which executes the read intensive application is improved, and there is no need for the virtual storage to process a read command executed by the read intensive application. Thus, it is expected that a shortage in CPU resource in the storage resource assignment process is resolved.

In S2308, the profile management program 81 determines whether or not there is a shortage in CPU resource. This is a determination as to whether or not the sum of the CPUs 502 in the blade resource management table 61 is less than the temporary number of total cores after being updated, as in S2304. In the case where the result of the determination in S2308 is false (S2308: NO), S2309 is performed. In the case where the result of the determination in S2308 is true (S2308: YES), S2310 is performed.

In S2309, the profile management program 81 decides blades so as to meet the temporary number of total cores. Specifically, for example, the profile management program 81 selects blades sequentially from a blade with a large CPU 502 so as to meet the temporary number of total cores on the basis of the blade resource management table 61. The selection of blades is terminated in the case where the sum of the CPUs 502 becomes equal to or more than the temporary number of total cores. The blades selected in S2309 are the storage blades.

In S2310, the profile management program 81 outputs an error. The error is displayed on the monitor 15, for example. Information on the error displayed may include a resource deficiency, the type of the deficient resource, and the amount of the deficient resource (e.g. the number of CPU cores), for example.

In S2311, the profile management program 81 determines whether or not there is an application (profile) with a reliability 808 of a predetermined value or more (e.g. "high"). In the case where the result of the determination in S2311 is true (S2311: YES), S2312 is performed. In the case where the result of the determination in S2311 is false (S2311: NO), S2313 is performed.

In S2312, the profile management program 81 makes a decision to duplex the storage blade to be assigned to the application with a reliability 808 of a predetermined value or more (e.g. "high"). The phrase "decision to duplex" may indicate a decision on a storage blade to which switching is made when a fault occurs.

In S2313, the profile management program 81 assigns storage blades to each profile. Specifically, for example, the profile management program 81 may assign storage blades to the profiles in the order of at least one of the number of sub-cores and the priority 807 from the larger (higher) side. In this event, the profile management program 81 may preferentially assign storage blades with a large CPU 502. The profile management program 81 duplexes the storage blade to be assigned to the application (profile) decided in S2312. That is, the profile management program 81 assigns two different storage blades to the application decided in S2312. The profile management program 81 may assign an identical storage blade to applications in time bandwidths 806 that are different from each other. The phrase "applications in time bandwidths 806 that are different from each other" indicate applications, the respective time bandwidths 806 of which overlap each other as little as possible, preferably do not overlap each other at all.

In S2314, the profile management program 81 determines whether or not all the storage blades meet the necessary bandwidth. Specifically, for example, the profile management program 81 determines, for each storage blade, whether or not the maximum physical bandwidth 1302 is equal to or more than the bandwidth that is necessary to demonstrate the performance 804 of the assigned application (profile). In the case where the result of the determination in S2314 is true (S2314: YES), S2319 is performed. In the case where the result of the determination in S2314 is false (S2314: NO), S2315 is performed.

In S2315, the profile management program 81 determines whether or not the bandwidth shortage can be resolved by the FM device 24a. Specifically, for example, the profile management program 81 determines whether or not the application assigned in S2313 has a read characteristic, and whether or not the total of the bandwidths 1704 (see FIG. 17) of available FM devices is equal to or more than an amount corresponding to the bandwidth shortage. In the case where the result of the determination in S2315 is true (S2315: YES), S2316 is performed. In the case where the result of the determination in S2315 is false (S2315: NO), S2317 is performed.

In S2316, the profile management program 81 assigns the application executed by the storage blades with the bandwidth shortage to the FM device 24a. A portion of the bandwidth 1704 of the FM device 24a as the assignment destination corresponding to the shortage will later be assigned to the virtual server to which the application is assigned.

In S2317, the profile management program 81 increases the number of storage blades in order to make up for the bandwidth shortage. The phrase "increase the number of storage blades" may indicate turning one or more of the existing blades into storage blades, or may indicate adding blades and turning the added blades into storage blades. Specifically, for example, the profile management program 81 increases the number of storage blades by one so that the sum of the CPUs 502 is equal to or more than the temporary number of total cores and the sum of the CPUs 502 is smaller.

In S2318, the profile management program 81 assigns the storage blades to each profile. The assignment method may be the same as that in S2313.

In S2319, the profile management program 81 updates the profile assignment management table 76 and the blade assignment management table 77 on the basis of the results of the processes preceding S2319. In the following description, a profile corresponding to one record (row) in the profile assignment management table 76 will be referred to as an "assigned profile". In S2301 to S2318, one virtual CTL corresponds to one storage blade. That is, an identifier including the character string "Storage", that is, the identifier of a virtual CTL, is assigned to a blade selected as a storage blade. In S2319, for example, the Workload 802 for the corresponding profile may be written as the Workload 802 for the assigned profile. The number of sub-cores for the corresponding profile may be written as the core requirement 903 for the assigned profile. The capacity 805 for the corresponding profile may be written as the capacity 905 for the assigned profile. The identifier of the storage blade (virtual CTL) assigned to the assigned profile (application) may be written as the assignment 906 for the assigned profile. For a blade turned into a storage blade, the identifier assigned to the blade (the identifier of a virtual CTL) may be written as the Role 602. For a blade turned into a storage blade, in addition, the number of the assigned CPU core (e.g. the numbers of all the cores corresponding to the CPU 502) may be written as the CPU 603, and the assigned memory capacity (e.g. the same value as the memory 503) may be written as the memory 604. The update of the tables 76 and 77 may not be performed collectively in S2319, and may be performed as appropriate in the processes preceding S2319 (in which case, S2319 is not necessary).

The storage resource assignment process allows blades with a number of CPU cores (and a bandwidth) that are necessary to demonstrate the performance 804 defined in the profile (performance required by the application) to be assigned as storage blades. In case of a resource shortage (in at least one of the CPU core and the bandwidth), such a resource shortage is expected to be resolved through the use of the FM device 24a.

FIG. 24A and FIG. 24B show a flowchart of the server resource assignment process.

In S2401, the profile management program 81 decides the number of CPU cores that are necessary to meet the performance 804 in the profile table 83. The number of cores is a temporary number of cores, and therefore hereinafter referred to as a "temporary number of total cores". Specifically, for example, the profile management program 81 calculates the total of the performances 804 in all the profiles possessed by the profile table 83, and calculates the temporary number of total cores on the basis of the total. The profile management program 81 also calculates, for each profile, the number of sub-cores that are necessary to demonstrate the performance 804 in the profile. The process in S2401 may be the same as that in S2301. Because S2301 has already been performed, S2401 may be omitted. In this case, the temporary number of total cores calculated in S2301 may be stored in the memory 12 as the initial temporary number of total cores.

In S2402, the profile management program 81 calculates a necessary memory capacity (hereinafter, a sub-memory capacity) for each profile (application). The necessary memory capacity corresponding to the profile is calculated on the basis of the performance 804 and the capacity 805 in the profile, for example. In S2402, the profile management program 81 also calculates a temporary total memory capacity (the sum of the sub-memory capacities corresponding to all the profiles).

In S2403, the profile management program 81 determines whether or not there is a shortage in at least one of the CPU resource and the memory resource. Whether or not there is a shortage in CPU resource corresponds to whether or not the number of remaining CPU cores is less than the temporary number of total cores, for example. The term "number of remaining CPU cores" indicates the total number of CPU cores on the blades possessed by the converged system 2 that have not been assigned in the storage resource assignment process. Typically, the number of remaining CPU cores corresponds to the sum of the CPUs 502 for all the server blade candidates (blades possessed by the converged system 2 that have not been turned into storage blades). Whether or not there is a shortage in memory resource corresponds to whether or not the total value of the memories 503 for all the server blade candidates is less than the temporary total memory capacity, for example. In the case where the result of the determination in S2403 is true (S2403: YES), S2404 is performed. In the case where the result of the determination in S2403 is false (S2403: NO), S2407 is performed.

In S2404, the profile management program 81 determines whether or not there is a profile (application) corresponding to a time bandwidth 806 that is different from any other time bandwidth 806. The process in S2404 may be the same as that in S2302. In the case where the result of the determination in S2404 is true (S2404: YES), S2405 is performed. In the case where the result of the determination in S2404 is false (S2404: NO), S2408 is performed.

In S2405, the profile management program 81 updates the temporary number of total cores and the temporary total memory capacity on the basis of the number of sub-cores and the sub-memory capacity, respectively, corresponding to the profile including the time bandwidth 806 that is different from any other time bandwidth 806. Specifically, the profile management program 81 subtracts the number of sub-cores and the sub-memory capacity corresponding to the profile including the time bandwidth 806 that is different from any other time bandwidth 806 from the temporary number of total cores and the temporary total memory capacity, respectively.

In S2406, the profile management program 81 the profile management program 81 determines whether or not there is a shortage in at least one of the CPU resource and the memory resource. The determination in S2406 may be the same as the determination in S2403. In the case where the result of the determination in S2406 is false (S2406: NO), S2407 is performed. In the case where the result of the determination in S2406 is true (S2406: YES), S2408 is performed.

In S2407, the profile management program 81 assigns the server blade candidates to the profiles (applications) as server blades. Specifically, for example, the profile management program 81 may assign the server blade candidates to the profiles as server blades in the order of at least one of the number of sub-cores and the priority 807 from the larger (higher) side. An identifier including the character string "Server", that is, the identifier of the virtual server, may be assigned to the server blade candidates when they are turned into server blades. The profile management program 81 may assign an identical server blade candidate to applications in time bandwidths 806 that are different from each other. As discussed earlier, the phrase "applications in time bandwidths 806 that are different from each other" indicate applications, the respective time bandwidths 806 of which overlap each other as little as possible, preferably do not overlap each other at all.

In S2408, the profile management program 81 partially reduces the CPU cores assigned to a target virtual CTL in the case where there is a shortage in CPU resource, and partially reduces the memory capacity assigned to the target virtual CTL in the case where there is a shortage in memory resource. The term "target virtual CTL" as used in this paragraph may indicate a virtual CTL assigned to a profile (application) with a priority 807 of a predetermined value or less. This can reduce the possibility that the performance 804 etc. for a profile with a high priority may not be met. The profile with a priority 807 of a predetermined value or less may be a profile with the lowest priority 807, for example. The CPU cores and the memory capacity which have been reduced may be assigned to virtual servers. In S2408, the profile management program 81 may reduce the number of CPU cores and the memory capacity for all the target virtual CTLs without determining whether or not a shortage in CPU resource and a shortage in memory resource have been resolved, or may reduce the number of CPU cores and the memory capacity for the target virtual CTL while determining whether or not a shortage in CPU resource and a shortage in memory resource have been resolved each time the number of CPU cores and the memory capacity are reduced. S2408 may be terminated when a number of CPU cores that is equal to or more than the number corresponding to the shortage in CPU resource and a memory capacity that is equal to or more than the capacity corresponding to the shortage in memory capacity have been reduced. In this event, in the case where the profiles have the same priority 807, a profile including a random-based (Rnd) I/O characteristic 803 may be given priority over a profile including a sequential-based (Seq) I/O characteristic 803. The upper limits of the number of CPU cores and the memory capacity that can be reduced for one virtual CTL may be decided in advance. For example, the upper limit of the number of CPU cores that can be reduced may be one.

In S2409, the profile management program 81 reduces the number of sub-cores (core requirement 903) for a target application (target profile) in the case where there is a shortage in CPU resource, and partially reduces the sub-memory capacity for the target application (target profile) in the case where there is a shortage in memory resource. The term "target application" as used in this paragraph may indicate an application (profile) with a priority 807 of a predetermined value or less. This is expected to resolve the resource shortage while maintaining the performance 804 etc. for a profile with a high priority. The application with a priority 807 of a predetermined value or less may be an application with the lowest priority 807, for example. In S2409, the profile management program 81 may reduce the number of CPU cores and the memory capacity for all the target applications without determining whether or not a shortage in CPU resource and a shortage in memory resource have been resolved, or may reduce the number of CPU cores and the memory capacity for the target application while determining whether or not a shortage in CPU resource and a shortage in memory resource have been resolved each time the number of CPU cores and the memory capacity are reduced. S2409 may be terminated when a number of CPU cores that is equal to or more than the number corresponding to the shortage in CPU resource and a memory capacity that is equal to or more than the capacity corresponding to the shortage in memory capacity have been reduced. The number (or capacity) corresponding to the shortage may indicate a shortage caused after S2408. In the case where the profiles have the same priority 807, a profile including a random-based (Rnd) I/O characteristic 803 may be given priority over a profile including a sequential-based (Seq) I/O characteristic 803. The upper limits of the number of CPU cores and the memory capacity that can be reduced for one target application may be decided in advance. For example, the upper limit of the number of CPU cores that can be reduced may be one. In the case where the shortages in CPU resource and memory capacity are resolved in S2408, the profile management program 81 may skip S2409. Alternatively, the profile management program 81 may perform both S2408 and S2409 without determining whether or not the shortages in CPU resource and memory capacity are resolved. Alternatively, the profile management program 81 may perform. S2409 before S2408, and may skip S2408 in the case where the shortages in CPU resource and memory capacity are resolved in S2409. Alternatively, the profile management program 81 may be adapted to perform only one of S2408 and S2409.

In S2410, the profile management program 81 determines whether or not all the server blades meet the necessary bandwidth. Specifically, for example, the profile management program 81 determines, for each server blade, whether or not the maximum physical bandwidth 1302 is equal to or more than the bandwidth that is necessary to demonstrate the performance 804 of the assigned application (profile). The bandwidth that is necessary to demonstrate the performance 804 may correspond to the user of information on the bandwidth condition input in the performance 804 such as for the DHW, of the applications registered in the Workload 802, for example. Alternatively, assuming a unit of 4 KB as an example of the block management unit for common file systems, the bandwidth that is necessary to demonstrate the performance 804 may be calculated on the basis of the necessary performance IOPS, by multiplying 4 KB by IOPS. In the case where the result of the determination in S2410 is true (S2410: YES), S2414 is performed. In the case where the result of the determination in S2410 is false (S2410: NO), S2411 is performed.

In S2411, the profile management program 81 reduces the bandwidth requirement 904 for the target application (target profile). The term "target application" as used in this paragraph may indicate an application (profile) with a priority 807 of a predetermined value or less. The application with a priority 807 of a predetermined value or less may be an application with the lowest priority 807, for example. In S2411, the profile management program 81 may reduce the bandwidth for all the target applications without determining whether or not the bandwidth shortage has been resolved, or may reduce the bandwidth for the target application while determining whether or not the bandwidth shortage has been resolved each time the bandwidth is reduced. S2411 may be terminated when the bandwidth has been reduced by an amount corresponding to the bandwidth shortage or more. In the case where the profiles have the same priority 807, a profile including a sequential-based (Seq) I/O characteristic 803 may be given priority over a profile including a random-based (Rnd) I/O characteristic 803. The upper limit of the bandwidth that can be reduced for one target application may be decided in advance.

In S2412, the profile management program 81 determines whether or not there is a shortage in CPU resource, memory resource, or bandwidth. In the case where the result of the determination in S2412 is true (S2412: YES), S2413 is performed. In the case where the result of the determination in S2412 is false (S2412: NO), S2414 is performed.

In S2313, the profile management program 81 outputs an error. The error is displayed on the monitor 15, for example. Information on the error displayed may include a resource deficiency, the type of the deficient resource, and the amount of the deficient resource (e.g. the number of CPU cores), for example.

In S2414, the profile management program 81 the profile management program 81 updates the profile assignment management table 76 and the blade assignment management table 77 on the basis of the results of the processes preceding S2414. Typically, one virtual server corresponds to one server blade. That is, an identifier including the character string "Server", that is, the identifier of a virtual server, is assigned to a blade selected as a server blade. In S2414, for example, the identifier of the server blade (virtual server) assigned to the assigned profile (application) may be added to the assignment 906 for the assigned profile. A number of CPU cores corresponding to the amount of reduction in S2409 may be reduced from the core requirement 903 for the assigned profile. A bandwidth corresponding to the amount of reduction in S2411 may be reduced from the bandwidth requirement 904 for the assigned profile. For a blade turned into a server blade, the identifier assigned to the blade (the identifier of a virtual server) may be written as the Role 602. For a blade turned into a server blade, in addition, the number of the assigned CPU core (e.g. the numbers of all the cores corresponding to the CPU 502) may be written as the CPU 603, and the assigned memory capacity (e.g. the same value as the memory 503) may be written as the memory 604. The update of the tables 76 and 77 may not be performed collectively in S2414, and may be performed as appropriate in the processes preceding S2414 (in which case, S2414 is not necessary).

The server resource assignment process allows blades with a number of CPU cores (and a memory capacity and a bandwidth) that are necessary to demonstrate the performance 804 defined in the profile (performance required by the application) to be assigned as storage blades. In addition, in the case where there is a shortage in resource (at least one of the CPU core, the memory capacity, and the bandwidth), it is expected that the resource shortage is resolved by allowing apart of the resource assigned to the virtual CTL for the virtual server, and partially reducing the resource once assigned in order to demonstrate the performance 804 defined in the profile (performance required for the application).

FIG. 25A to FIG. 25C show a flowchart of the flash resource assignment process.

In S2501, the profile management program 81 reads the flash resource management table 71.

In S2502, the profile management program. 81 reads one profile (e.g. the top profile) from the profile table 83. In the following description of FIG. 25A to FIG. 25C, the read (selected) profile is referred to as a "target profile", and the application corresponding to the target profile is referred to as a "target application".

In S2503, the profile management program 81 determines whether or not the I/O characteristic 803 in the read profile is based on read. In the case where the result of the determination in S2503 is true (S2503: YES), S2504 is performed. In the case where the result of the determination in S2503 is false (S2503: NO), S2504 is performed.

In S2504, the profile management program 81 selects the FM device 24a with a short writing life for the target application on the basis of the flash resource management table 71. The FM device 24a with a short writing life may indicate an FM device, of a plurality of FM devices 24a, with a relatively shorter life, and may indicate an FM device according to an MLC scheme (hereinafter, an MLC flash), for example. In the embodiment, the FM device 24a with a short writing life is an MLC flash. The flash resource management table 71 may store for each FM device 24a the cumulative number of erasure times and the upper limit of the number of erasure times, and the FM device 24a with a short writing life may be decided on the basis of the difference between the cumulative number of erasure times and the upper limit of the number of erasure times.

In S2505, the profile management program 81 updates an MLC list. The MLC list is a list of profiles (applications) as assignment target candidates for the MLC flash. The MLC list includes profiles targeted in S2504, of the profiles selected in the flash resource assignment process. In the MLC list, the profiles may be arranged in accordance with predetermined criteria. In the MLC list, for example, the profiles may be arranged in the order of the reliability 806 from the higher side.

In S2510, the profile management program 81 selects the FM device 24a with a long writing life for the target application on the basis of the flash resource management table 71. The FM device 24a with a long writing life may indicate an FM device, of a plurality of FM devices 24a, with a relatively longer life, and may indicate an FM device according to an SLC scheme (hereinafter, an SLC flash), for example. In the embodiment, the FM device 24a with a long writing life is an SLC flash.

In S2511, the profile management program 81 updates an SLC list. The SLC list is a list of profiles (applications) as assignment target candidates for the SLC flash. The SLC list includes profiles targeted in S2510, of the profiles selected in the flash resource assignment process. In the SLC list, the profiles may be arranged in accordance with predetermined criteria. In the SLC list, for example, the profiles may be arranged in the order of the reliability 806 from the higher side.

In S2506, the profile management program 81 determines whether or not the determination in S2503 has been performed for all the profiles in the profile table 83. In the case where the result of the determination in S2506 is true (S2506: YES), S2507 is performed. In the case where the result of the determination in S2506 is false (S2506: NO), in S2509, the profile management program 81 reads the next profile (application) from the profile table 83, and performs S2503 for the profile.

In S2507, the profile management program 81 determines, for each of the MLC flash and the SLC flash, whether or not the performances of the FM devices possessed by the converged system 2 are sufficient. Specifically, for example, the profile management program 81 determines, for each of the MLC flash and the SLC flash, whether or not the Type-specific total of the performances 1703 of the FM devices 24a is equal to or more than the total of the performances 804 for all the profiles in each of the lists (the MLC list or the SLC list). In the case where the result of the determination in S2507 is true for both the MLC flash and the SLC flash (S2507: YES), S2508 is performed. In the case where the result of the determination in S2507 is false for at least one of the MLC flash and the SLC flash (S2507: NO), S2512 is performed.

In S2512, the profile management program 81 selects, for the FM device for which the result of the determination in S2507 is NO (hereinafter in this paragraph, a "target type flash"), of the MLC flash and the SLC flash, profiles (applications) such that the performances of the FM devices 24a that are present are used as much as possible. The profiles may be selected in accordance with predetermined rules. For example, the profiles may be selected from the list (the MLC list or the SLC list) corresponding to the target type flash in the order of the priority 807 from the higher side. If the profiles have the same priority 807, profiles with a higher resource requirement (e.g. at least one of the core requirement 903 and the bandwidth 904) may be preferentially selected. For the target type flash, the profiles may be selected such that the total of the performances 804 of the selected profiles becomes maximum in the range not exceeding the total of the performances 1703 of the FM devices 24a. Alternatively, for the target type flash, the profiles may be selected such that the total of the performances 804 of the selected profiles becomes minimum in the range equal to or more than the total of the performances 1703 of the FM devices 24a. As a result of S2512, profiles (applications) are narrowed for the target type flash. In other words, profiles other than the selected profiles (applications) are removed from the list (the MLC list or the SLC list) corresponding to the target type flash.

In S2508, the profile management program 81 selects a desired MLC flash from the flash resource management table 71. The MLC flash serves as a target MLC flash in S2513.

In S2513, the profile management program 81 selects one profile (e.g. the top profile of unselected profiles) from the MLC list, and assigns the virtual machines (e.g. all the virtual machines or only the virtual servers) assigned to the selected profile (hereinafter in the description of FIG. 25A to FIG. 25C, an "MLC target profile") to the target MLC flash. Specifically, for example, necessary amounts based on the performance 804, the capacity 805 (905), and the bandwidth requirement 904 of the target MLC profile are assigned from unassigned amounts of the performance 1703, the bandwidth 1704, and the capacity 1705 (see FIG. 17) of the target MLC flash. An area of the target MLC flash that is assigned to the MLC target profile corresponds to a read cache area. The profile management program 81 calculates the remaining capacity by subtracting the capacity assigned to the target MLC profile (e.g. the sub-memory capacity of the target MLC profile) from the capacity 1705 of the target MLC flash. Alternatively, an area corresponding to a proportion of the capacity of the FM device that is necessary to assign a necessary performance may be assigned from the performance of the target MLC flash.

In S2514, the profile management program 81 determines whether or not all the profiles (applications) have been assigned from the MLC list. In the case where the result of the determination in S2514 is true (S2514: YES), S2519 is performed. In the case where the result of the determination in S2514 is false (S2514: NO), S2515 is performed.

In S2515, the profile management program 81 determines whether or not the remaining capacity of the target MLC flash is larger than a certain capacity. The certain capacity may be zero, or may be a capacity (e.g. a sub-memory capacity) based on the capacity 805 (905) of the profile to be next selected from the MLC list. In the case where the result of the determination in S2515 is false (S2515: NO), the profile management program 81 selects another MLC flash (any of the MLC flashes that have not been selected in the flash resource assignment process) (S2516), and proceeds to step 2513. The selected MLC flash serves as a target MLC flash in next S2513. In the case where the result of the determination in S2515 is true (S2515: YES), on the other hand, S2513 is performed again for the target MLC flash with the remaining capacity described above.

In S2519, the profile management program 81 selects a desired SLC flash from the flash resource management table 71. The SLC flash serves as a target MLC flash in S2520.

In S2520, the profile management program 81 selects one profile (e.g. the top profile of unselected profiles) from the SLC list, and assigns the virtual machines (e.g. all the virtual machines or only the virtual CTLs) assigned to the selected profile (hereinafter in the description of FIG. 25A to FIG. 25C, an "SLC target profile") to the target SLC flash. Specifically, for example, necessary amounts based on the performance 804, the capacity 805 (905), and the bandwidth requirement 904 of the target SLC profile are assigned from unassigned amounts of the performance 1703, the bandwidth 1704, and the capacity 1705 (see FIG. 17) of the target SLC flash. An area of the target SLC flash that is assigned to the SLC target profile corresponds to a read/write cache area. The profile management program 81 calculates the remaining capacity by subtracting the capacity assigned to the target SLC profile (e.g. the sub-memory capacity of the target SLC profile) from the capacity 1705 of the target SLC flash. Alternatively, an area corresponding to a proportion of the capacity of the FM device that is necessary to assign a necessary performance may be assigned from the performance of the target MLC flash.

In S2521, the profile management program 81 updates, for the virtual CTL of the virtual machines assigned in S2520, the capacity assigned to the virtual CTL (the capacity of the target SLC flash) to a predetermined proportion (e.g. 10%) of the capacity 905 of the target SLC profile (application). The predetermined proportion may not necessarily be constant, and different proportions may be adopted for each execution of S2521, for example.

In S2522, the profile management program 81 determines whether or not all the profiles (applications) have been assigned from the SLC list. In the case where the result of the determination in S2522 is true (S2522: YES), S2525 is performed. In the case where the result of the determination in S2522 is false (S2522: NO), S2523 is performed.

In S2523, the profile management program 81 determines whether or not the remaining capacity of the target SLC flash is larger than a certain capacity. The certain capacity may be zero, or may be a capacity (e.g. a sub-memory capacity) based on the capacity 805 (905) of the profile to be next selected from the SLC list. In the case where the result of the determination in S2523 is false (S2523: NO), the profile management program 81 selects another SLC flash (any of the SLC flashes that have not been selected in the flash resource assignment process) (S2524), and proceeds to step 2520. The selected SLC flash serves as a target SLC flash in next S2520. In the case where the result of the determination in S2523 is true (S2523: NO), on the other hand, S2520 is performed again for the target SLC flash with the remaining capacity described above.

In the case where there is a remaining capacity in the mounted SLC flash even after the result of the determination in S2522 indicates that a necessary capacity has been assigned from the SLC flash to all the profiles, and there is an unassigned profile with no capacity ramined in the MLC flash assigned before S2514, the SLC flash may be assigned as a read cache.

In S2525, the profile management program 81 determines whether or not there is a profile for in-memory processing in the profile table 83. The profile for in-memory processing may be a profile that meets at least one of the following conditions: it includes an explicit indication of being "in-memory processing"; its application type specified from the Workload 802 is suitable for in-memory processing; and its capacity 905 is equal to or less than a predetermined capacity, for example. In the converged system 2, for in-memory processing, communication according to a memory access interface such as NVMe (Non-Volatile Memory Express) can be performed between each blade 21 and the FM device 24a. In the case where the result of the determination in S2525 is false (S2525: NO), S2534 is performed. In the case where the result of the determination in S2525 is true (S2525: YES), S2526 is performed.

In S2526, the profile management program 81 selects the profile for in-memory processing (hereinafter in the description of FIG. 25A to FIG. 25C, an "in-line profile") from the profile table 73, and acquires the capacity 805 in the in-line profile.

In S2527, the profile management program 81 determines whether or not there is an FM device resource that can be assigned to the in-line profile. The "FM device resource that can be assigned to the in-line profile" indicates a free space (space in the FM device) that is equal to or more than the capacity 805 of the in-line profile, for example. Besides the capacity, the FM device resource may include at least one of the performance and the bandwidth. For example, the determination in S2527 may include a determination as to whether or not the performance 804 and the bandwidth requirement 904 of the in-line profile are equal to or less than unassigned portions of the performance 1703 and the bandwidth 1704 of the FM device, respectively. The free space in the FM device (and the unassigned portions of the performance 1703 and the bandwidth 1704 of the FM device) can be specified on the basis of the flash resource management table 71 (see FIG. 17) and the result of the assignment in S2501 to S2526. In the case where the result of the determination in S2527 is true (S2527: YES), S2528 is performed. In the case where the result of the determination in S2527 is false (S2527: NO), S2534 is performed.

In S2528, the profile management program 81 selects an FM device resource for the in-line profile from FM device resource that can be assigned to the in-line profile, and assigns the in-line profile (the virtual machine corresponding to the in-line profile) to the selected FM device resource. The FM device resource may be selected preferentially from the SLC flash over the MLC flash. The FM device area assigned to the in-line profile is one of the areas for which the R/W 1803 is "Memory (not shown)", for example.

In S2529, the profile management program 81 determines whether or not there is an FM device area that can be used as "Store". The determination may be made on the basis of whether or not there is a free space in at least one of the FM devices 24a, for example. Hereinafter in the description of FIG. 25A to FIG. 25C, the total of the free spaces in the one or more FM devices 24a is referred to as a "remaining free space". In the case where the result of the determination in S2529 is true (S2529: YES), S2530 may be performed. In the case where the result of the determination in S2529 is false (S2529: NO), S2534 may be performed.

In S2530, the profile management program 81 assigns the remaining free space to one or more profiles (hereinafter, store-target profiles) that suit predetermined conditions. The area having the assigned remaining free space corresponds to one of the areas for which the R/W 1803 is "Store". The store-target profiles may be profiles that meet at least one of the following conditions: its priority 807 is a certain level or higher; and its performance 804 or core requirement 903 is a predetermined value or more. The assignment may be made preferentially from the SLC flash over the MLC flash.

In S2531, the profile management program 81 determines whether or not a tier control function is active for at least one of the store-target profiles. The term "tier control function" as used in the embodiment indicates a function of moving data between tiers in units of pages in a pool having a plurality of tiers. Whether or not the tier control function is effective may be made on the basis of whether or not there is a pool having a plurality of tiers, and whether or not tier control effectiveness is associated with a TPVOL to which a real page is assigned from the pool (a TPVOL used by the application corresponding to the store-target profile). In the case where the result of the determination in S2531 is true (S2531: YES), S2533 may be performed. In the case where the result of the determination in S2531 is false (S2531: NO), S2532 may be performed.

In S2532, the profile management program 81 distributes the remaining free space uniformly to all the store-target profiles.

In S2533, the profile management program 81 assigns a part or all of the remaining free space to the store-target profile for which the tier control function is effective so as to achieve a capacity ratio that is recommended for the tier control function associated with the store-target profile. If there remains an unassigned space in the remaining free space, the unassigned space may be distributed uniformly to the remaining store-target profiles. The term "capacity ratio" indicates the capacity ratio among the tiers in the pool, for example. For example, if the pool has 100 TB and the ratio among a tier 1 based on an FM device such as an SSD, a tier 2 based on an SAS-HDD, and a tier 3 based on a SATA-HDD is 5:3:2, the capacity of the tier 1 is 50 TB, and the remaining free space is assigned as a part of the tier 1 such that the tier 1 has 50 TB.

In S2534, the profile management program 81 updates the flash resource assignment management table 68. That is, the flash resource management table 68 (see FIG. 18) is created on the basis of the results of the processes in S2501 to S2533.

As a result of the flash resource assignment process, as large a portion as possible of the resource of the FM device 24a possessed by the converged system 2 is assigned. Preferably, all of the FM device 24a is assigned. For example, as seen from a comparison between FIG. 17 and FIG. 18, all of the performance 1703, the bandwidth 1704, and the capacity 1705 of each FM device are assigned to the virtual machine corresponding to the profile.

According to the flash resource assignment process, an MLC flash is assigned as an FM device with a short writing life to an application corresponding to the read intensive I/O characteristic 703. Consequently, the frequency of writing into a cache is lower for an application corresponding to the read intensive I/O characteristic 703 than for an application corresponding to the non-read intensive I/O characteristic 703. Therefore, it is expected that the time before the end of the life of the FM device area with a short writing life can be extended as much as possible.

According to the flash resource assignment process, the area possessed by the FM device 24a is preferentially assigned as a cache area such as a read cache and an R/W cache, and assigned as a store area in the case where there is a remaining capacity. That is, the FM device 24a is preferentially used to improve the performance.

In the embodiment, a network resource assignment process for creating the network resource assignment management table 72 (see FIG. 20) and an SAS resource assignment process for creating the SAS resource assignment management table 75 (see FIG. 21) are performed in addition to the flash resource assignment process. Both the network resource assignment process and the SAS resource assignment process are performed before the fabric resource assignment process (S2210 in FIG. 22).

In the network resource assignment process, the profile management program 81 creates the network resource assignment management table 72 on the basis of at least one of information 802 to 808 and 902 to 906 on each profile and the network resource management table 74. In the following description, one profile is taken as an example (in this paragraph, referred to as a "target profile"). Specifically, for example, the profile management program 81 may assign a virtual machine indicated by the assignment 906 of the target profile to a network I/F of a type (Type 1802) that is suitable for the type (Workload 802) of the application corresponding to the target profile, and with a bandwidth 1803 that is equal to or more than a bandwidth according to the bandwidth requirement 904 of the target profile. The number of ports to be assigned (Port number 2002) may be decided on the basis of at least one of the performance 804 and the bandwidth requirement 804 of the target profile. Whether or not the Initiator 2004 is turned on (to possibly be a transmission initiator) made be decided on the basis of the type of the virtual machine (whether or not the virtual machine is a virtual server), the topology between the virtual machines assigned to the target profile, and so forth. For example, even if the virtual machine is a virtual CTL, and if the virtual CTL receives an I/O command from a virtual server or transmits an I/O command to a virtual CTL within another virtual storage, the Initiator 2004 corresponding to the virtual machine (Role 2003) may be turned on (to possibly be a transmission initiator). Similarly, whether or not the Target 2005 is turned on (to possibly be a transmission destination) made be decided on the basis of the type of the virtual machine (whether or not the virtual machine is a virtual CTL), the topology between the virtual machines assigned to the target profile, and so forth. The guaranteed bandwidth 2007 for the assigned virtual machine may be decided on the basis of the bandwidth 2006 for the virtual machine, the Type 1902 of the network I/F, and so forth. For example, the guaranteed bandwidth may be a bandwidth that is necessary for an application with a high priority and a high reliability for the Workload 802 operating on the virtual server assigned to the network I/F. The network resource assignment management table 72 is created in this way.

In the SAS resource assignment process, the profile management program 81 creates the SAS resource assignment management table 75 on the basis of at least one of information 802 to 808 and 902 to 906 on each profile and an SAS management table (not shown). The SAS management table may have, for each SAS-I/F, an ID serving as the identifier of the SAS-I/F and information representing the bandwidth of the SAS-I/F. In the following description, one profile is taken as an example (in this paragraph, referred as a "target profile"). Specifically, for example, the profile management program 81 determines whether or not the virtual machine corresponding to the target profile is assigned to the SAS-I/F on the basis of the type (Workload 802), the bandwidth 1805, or the like of the application corresponding to the target profile. In the case where the result of the determination is true, the profile management program 81 decides which SAS-I/F the virtual machine corresponding to the target profile is assigned to. For example, the SAS-I/F may be assigned on the basis of the total of the bandwidths for the Workloads 802 assigned to the virtual storage CTL (excluding the bandwidth that is necessary for applications that do not overlap each other in terms of use time bandwidth). In the case where there is a shortage in bandwidth for the SAS-I/F, a plurality of SAS-I/Fs may be assigned to one virtual storage CTL. The SAS resource assignment management table 75 is created in this way.

FIG. 26 is a flowchart of the fabric resource assignment process.

In S2601, the profile management program 81 reads the blade bandwidth management table 63 and the I/O module bandwidth management table 66 from the memory 12.

In S2602, the profile management program 81 reads the profile assignment management table 76, the flash resource assignment management table 68, the network resource assignment management table 72, and the SAS resource assignment management table 75, and sets a path between blades and a path between a blade and an I/O module on the basis of the tables 76, 68, 72, and 75. In the following description, one profile is taken as an example (in this paragraph, referred as a "target profile"). In this paragraph, a virtual server indicated by the assignment 906 of the target profile is referred to as a "target virtual server", a blade to which the target virtual server is assigned is referred to as a "target server blade", a virtual CTL indicated by the assignment 906 of the target profile is referred to as a "target virtual CTL", and a blade to which the target virtual CTL is assigned is referred to as a "target storage blade". The profile management program 81 sets a path between the target server blade and the target storage blade, a path between the target server blade and the I/O module to which the target virtual server is assigned, and a path between the target storage blade and the I/O module to which the target virtual CTL is assigned, for example. The profile management program 81 calculates a total use bandwidth (the total of the bandwidths of the paths set in S2602) on the basis of the blade bandwidth management table 63 and the I/O module bandwidth management table 66.

In S2603, the profile management program 81 references the backbone bandwidth management table 69, and determines whether or not the total use bandwidth calculated in S2602 is equal to or less than a backbone bandwidth (a physical bandwidth 1402). In the case where the result of the determination in S2603 is true (S2603: YES), S2308 is performed. In the case where the result of the determination in S2603 is false (S2603: NO), S2604 is performed.

In S2604, the profile management program 81 determines whether or not there is an application (profile) corresponding to a time bandwidth 806 that is different from any other time bandwidth 806. The process in S2604 may be the same as that in S2302 in FIG. 23A. In the case where the result of the determination in S2604 is true (S2604: YES), S2605 is performed. In the case where the result of the determination in S2604 is false (S2604: NO), S2607 is performed.

In S2605, the profile management program 81 subtracts a bandwidth 904 that is necessary for the application (profile) corresponding to the time bandwidth 806 that is different from any other time bandwidth 806 from the total use bandwidth.

In S2606, the profile management program 81 determines whether or not the total use bandwidth after S2605 is equal to or less than the backbone bandwidth. In the case where the result of the determination in S2606 is true (S2606: YES), S2608 is performed. In the case where the result of the determination in S2606 is false (S2606: NO), S2607 is performed.

In S2607, the profile management program 81 reduces the bandwidth 904 for a profile (application) with a priority of a predetermined value or less such that the total use bandwidth becomes equal to or less than the backbone bandwidth. The profile with a priority of a predetermined value or less may be a profile with the lowest priority, for example.

In S2609, the profile management program 81 updates the inter-blade bandwidth management table 62 and the blade-I/O module bandwidth management table 65 on the basis of the results of the processes in S2601 to S2608. Values to be recorded in each cell of the tables 62 and 65 are based on the tables 63, 66, 72, 75, and 68 and the paths set in S2602. For example, From and To in the table 62 (see FIG. 11) may be based on the Initiator 2004 and the Target 2005, and From and To in the table 65 (see FIG. 12) may be based on whether a virtual machine or an I/O device. Specifically, a bandwidth between the target server blade and the target storage blade may be assigned on the basis of the bandwidth requirement 904 needed by each Workload and the assignment 906 assigned to each Workload described in the profile assignment management table 76. The total of the bandwidths between the virtual server blade and the virtual storage blade assigned to all the Workloads is assigned. For example, Workloads DB1 and DWH are targets between Storage1 and Server1, and therefore the total of the bandwidth requirements is 20 GB/s. It should be noted, however, that the total bandwidth requirement may be reduced in the case where the use time bandwidth 806 is different as determined in step S2604.

The fabric resource assignment process can calculate a bandwidth for communication between the virtual machines and a bandwidth for communication between the virtual machine and the I/O module.

As described in relation to FIG. 22, the profile management program 81 transmits a system resource assignment indication to the converged system 2 (e.g. a blade 21) (S2211 in FIG. 22).

Figure 27:
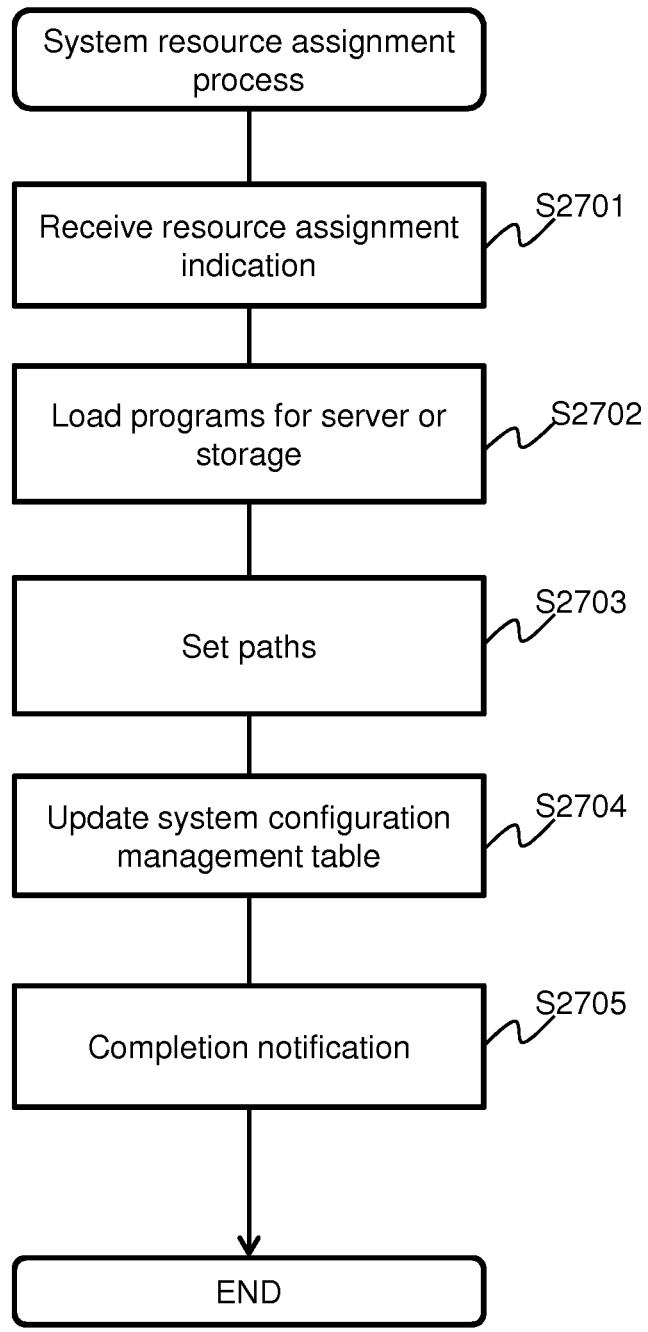
FIG. 27 is a flowchart of a system resource assignment process.

FIG. 27 is a flowchart of the system resource assignment process.

This process is performed by a blade 21 having received the system resource assignment indication from the profile management program 81. The blade 21 may be a master blade as discussed earlier, or may be each blade 21. In the embodiment, a master blade 21M configured to communicate with the management computer 1 is provided, and the master blade 21M receives the system resource assignment indication.

In S2701, the master blade 21M receives the system resource assignment indication from the management computer 1. The master blade 21M (the blade resource management program 51) stores information accompanying the indication, e.g. the tables 62, 65, 68, 72, 75, 76, and 77, in the cache 22. In addition, the master blade 21M (the blade resource management program 51) transmits a resource assignment indication to each of the other blades 21.

In S2702, each of the plurality of blades 21 including the master blade 21M performs the following process on the basis of the assignment indication. In the following description, one blade 21 (in the description of FIG. 27, referred to as a "target blade 21") is taken as an example. The target blade 21 (each blade resource management program 51) loads programs corresponding to the Role 602 of the target blade 21. For example, if the role 602 represents a virtual server, the programs 51, 52, 55, 56, and 58, for example, may be loaded as programs for a server. If the virtual server 602 represents a virtual CTL, the programs 51 to 57 are loaded as programs for a storage. In the case where the target blade 21 is a server blade, an application program 58 corresponding to the Workload 902 corresponding to the virtual server (assignment 906) implemented by the target blade 21 may be loaded to the target blade 21. In the case where operation (service) of the converged system 21 is started, the target blade 21 may execute the loaded application program 58.

In S2703, the target blade 21 (each blade resource management program 51) sets a path between the target blade and other blades and a path between the target blade and one or more I/O modules on the basis of the inter-blade bandwidth management table 62 and the blade-I/O module bandwidth management table 65. Other devices (other blades 21 or I/O modules 24) to be connected to the target blade can be specified from the tables 62 and 65. In the case where the target blade 21 is not the master blade 21M, the target blade 21 may transmit a setting completion notification to the master blade 21M. The setting completion notification may also be transmitted in the case where other setting is made in addition to path setting. The term "other setting" may indicate that the virtual CTL implemented by the target blade 21 provides a VOL for a capacity represented by the capacity 905 corresponding to the virtual CTL to a virtual server configured to communicate with the virtual CTL. The provided VOL may be an RVOL or a VVOL. A PDEV management table (not shown) in the cache 22 may include information related to a plurality of PDEVs (such as the type of each PDEV and the capacity of each PDEV, for example), and the target blade 21 may secure, from the plurality of PDEVs, a capacity (e.g. a capacity represented by the capacity 905) needed for the target blade 21 (a virtual CTL) on the basis of the PDEV management table. In the case where it is necessary to construct a hierarchical pool (a pool including a plurality of tiers) from a profile corresponding to a virtual CTL assigned to the target blade, for example, the target blade may construct a hierarchical pool according to a recommended capacity ratio on the basis of the PDEV management table, and provide a TPVOL with a capacity represented by the capacity 905 of the profile to the virtual server. Each area of the caches 22 and 22 may be logically divided and assigned to a plurality of virtual CTLs on the basis of the number of virtual CTLs, the capacity 905 of each profile, and the correlation between the profiles and the virtual CTLs. That is, a usable capacity of the cache 22 may be assigned to each virtual CTL. Thus, in S2703, construction (setting) of a logical configuration that is necessary to start service of the converged system 2, such as creation of a VOL and provision of a VOL, may be performed in addition to path setting. The setting completion notification may be transmitted to the master blade 21M when the logical configuration is constructed.

In S2704, the master blade 21M (the blade resource management program 51) updates the system configuration management table 67 (see FIG. 3). This update may be performed in the case where the master blade 21M has received the setting completion notification from all the other blades 21, for example. The system configuration management table 67 may include information representing which device (a blade or an I/O module) is coupled to which blade.

In S2705, the master blade 21M (the blade resource management program 51) notifies the management computer 1 (the profile management program 81) of the completion of the process.

As a result of the system resource assignment process, a configuration according to the tables 62, 65, 68, 72, 75, 76, and 77, that is, a logical configuration that meets the user request (such as the performance 804 defined in the profile) as much as possible, is constructed in the converged system 2.

After that, the converged system 2 is brought into operation. That is, service of the converged system 2 is started. This allows the virtual server (e.g. the application 58 executed by the virtual server) to thereafter accept a command from a client apparatus (not shown) (e.g. accept a command via the I/O module 24), and process the command, for example. In addition, the virtual server (e.g. the application 58 executed by the virtual server) can issue a write command or a read command in order to process the command or for other processes. The write command is either a storage write command or a PDEV write command, for example. The read command is either a storage read command or a PDEV read command, for example. The storage write command and the storage read command are a write command and a read command, respectively, specifying a VOL provided from a virtual CTL. The PDEV write command and the PDEV read command are a write command and a read command, respectively, specifying a PDEV.

A write process and a read process performed in the converged system 2 will be described below.

Figure 28:
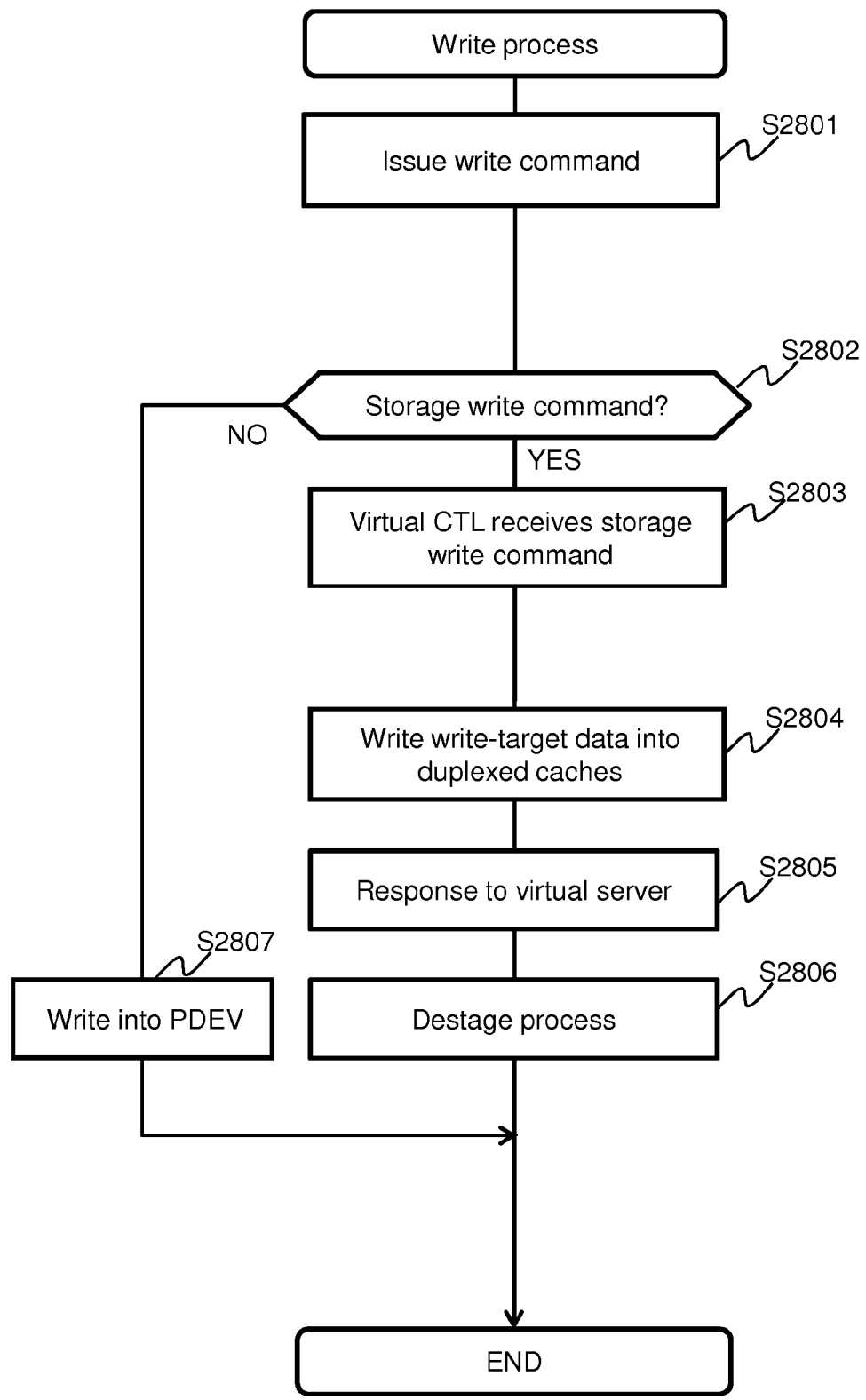
FIG. 28 is a flowchart of a write process.

FIG. 28 is a flowchart of the write process.

The virtual server (e.g. the application 58) issues a write command (S2801).

In the case where the write command is a PDEV write command (S2802: NO), the PDEV write command is transmitted via the network switch 23 to the I/O module 24 serving as a PDEV or a PDEV coupled to the I/O module 24, and write-target data according to the PDEV write command are written into the PDEV (S2807).

In the case where the write command is a storage write command (S2802: YES), the storage write command is transmitted via the network switch 23 to a storage blade implementing a virtual CTL providing a VOL designated by the storage write command, and the storage write command is received by the storage blade (2803). The virtual CTL (e.g. the I/O control program 54 executed by the virtual CTL) writes write-target data according to the storage write command into both the caches 22 and 22 (2804). The virtual CTL (e.g. the I/O control program 54) transmits a response to the virtual server (S2805). Thereafter, the virtual CTL (e.g. the I/O control program 54) performs a destage process at a desired timing (S2806). Specifically, for example, the virtual CTL writes write-target data on the cache 22 into a PDEV (hereinafter, a write-destination PDEV) on which the write-destination area in the VOL designated by the storage write command is based. The write-destination PDEV is the I/O module 24 or a PDEV coupled to the I/O module 24, for example. That is, in the destage process, the virtual CTL issues a PDEV write command designating a write-destination PDEV. The PDEV write command is received via the network switch 23 by the write-destination PDEV, and data according to the PDEV write command are written into the write-destination PDEV.

Figure 29:
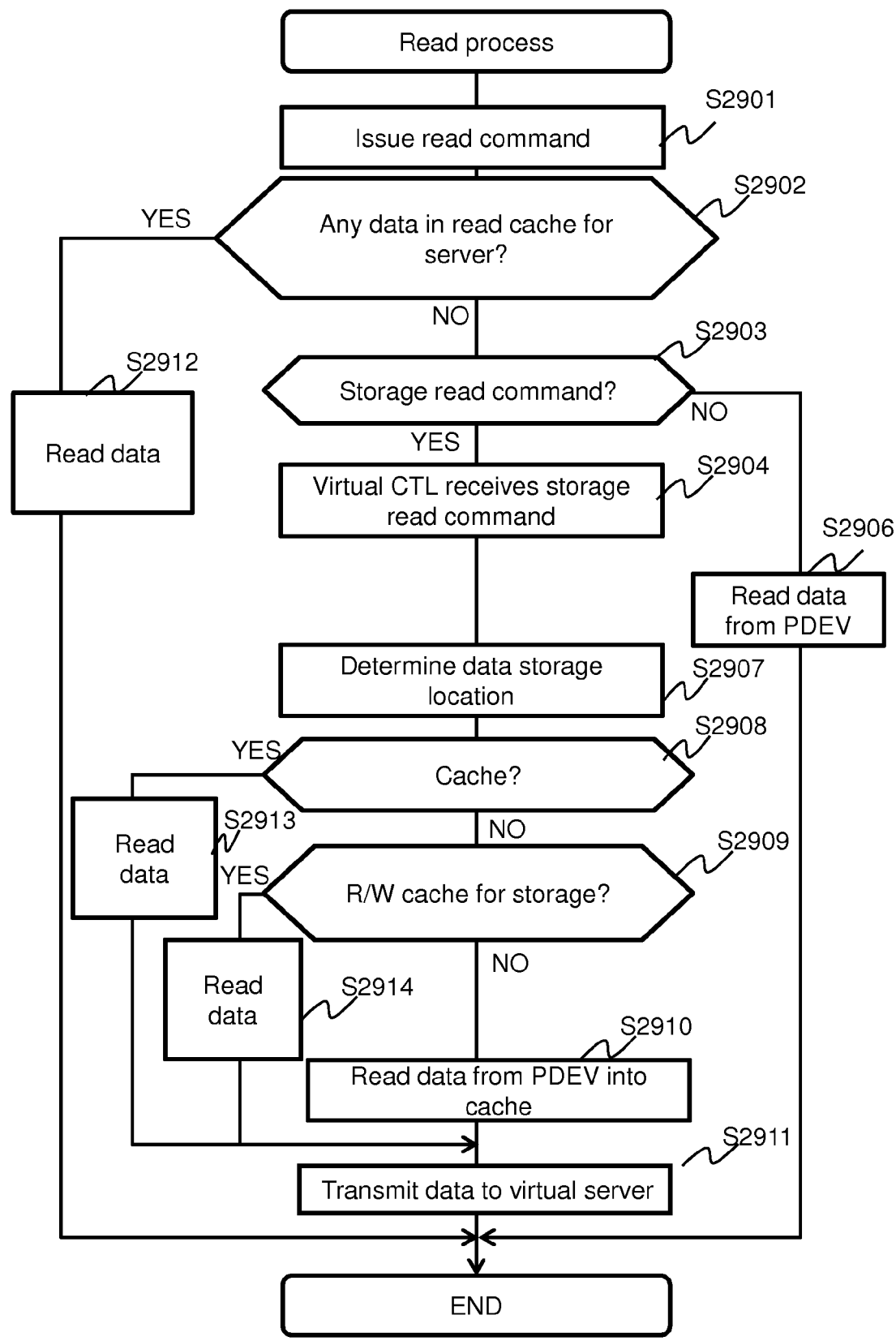
FIG. 29 is a flowchart of a read process.

FIG. 29 is a flowchart of the read process.

The virtual server (e.g. the application 58) issues a read command (S2901).

The virtual server (e.g. the cache management program 57) determines whether or not a read cache (FM device area) has been assigned to the virtual server and whether or not there are read-target data according to the read command in the read cache (S2902).

In the case where the result of the determination in S2902 is true (S2902: YES), the virtual server (e.g. the cache management program 57) reads data from the read cache (FM device area) assigned to the virtual server (S2912). Specifically, for example, the virtual server issues a PDEV read command designating a read-source FM device. The PDEV read command is received via the network switch 23 by the read-source FM device 24a. The read-source FM device 24a reads data according to the PDEV read command, and returns the data to the virtual server.

In the case where the result of the determination in S2902 is false (S2902: NO), the virtual server (e.g. the cache management program 57) issues a read command out of the server blade implementing the virtual server.

In the case where the read command is a PDEV read command (S2903: NO), the PDEV read command is transmitted via the network switch 23 to the I/O module 24 serving as a PDEV or a PDEV coupled to the I/O module 24, and data according to the PDEV read command are sent from the PDEV to the virtual server which transmitted the PDEV read command (S2906).

In the case where the read command is a storage read command (S2903: YES), the storage read command is transmitted via the network switch 23 to a storage blade implementing a virtual CTL providing a VOL designated by the storage read command, and the storage read command is received by the storage blade (S2904). The virtual CTL (e.g. the I/O control program 54) determines the storage destination of the read-target data according to the received storage read command (S2907).

In the case where there are read-target data in the cache 22 (S2908: YES), the virtual CTL reads the read-target data from the cache 22.

In the case where there are read-target data in the R/W cache (FM device area) of the virtual CTL (S2909: NO, S2909: YES), the virtual CTL reads the read-target data from the R/W cache (FM device area) (S2914). Specifically, for example, the virtual server issues a PDEV read command designating a read-source FM device having the R/W cache of the virtual CTL. The PDEV read command is received via the network switch 23 by the read-source FM device 24a. The read-source FM device 24a reads data according to the PDEV read command, and returns the data to the virtual CTL.

In the case where there are read-target data in neither the cache 22 nor the R/W cache (FM device area) (S2909: NO), the virtual CTL reads read-target data from a PDEV (hereinafter, a read-source PDEV) on which the read-source area in the VOL designated by the storage read is based, and writes the read-target data into the cache 22 (or the R/W cache (FM device area)). The read-destination PDEV is the I/O module 24 or a PDEV coupled to the I/O module 24, for example. That is, in S2910, the virtual CTL issues a PDEV read command designating a read-source PDEV. The PDEV read command is received via the network switch 23 by the read-source PDEV, and data according to the PDEV read command are transmitted from the read-source PDEV to the virtual CTL. The virtual CTL returns the read-target data stored in the cache 22 (or the R/W cache) to the virtual server which transmitted the storage read command (S2911).

The virtual server may write the read-target data received in S2911, S2912, or S2906 into the read cache (FM device area) assigned to the virtual server. In the event of writing, a write command is transmitted to the FM device having the read cache.

In the read process shown in FIG. 29, in the case where read-target data are stored in both the cache 22 and the FM device 24a, the virtual CTL reads the read-target data from the cache 22 as described above. The read-target data can be read faster from the cache 22 than from the FM device 24a.

Figure 30A:
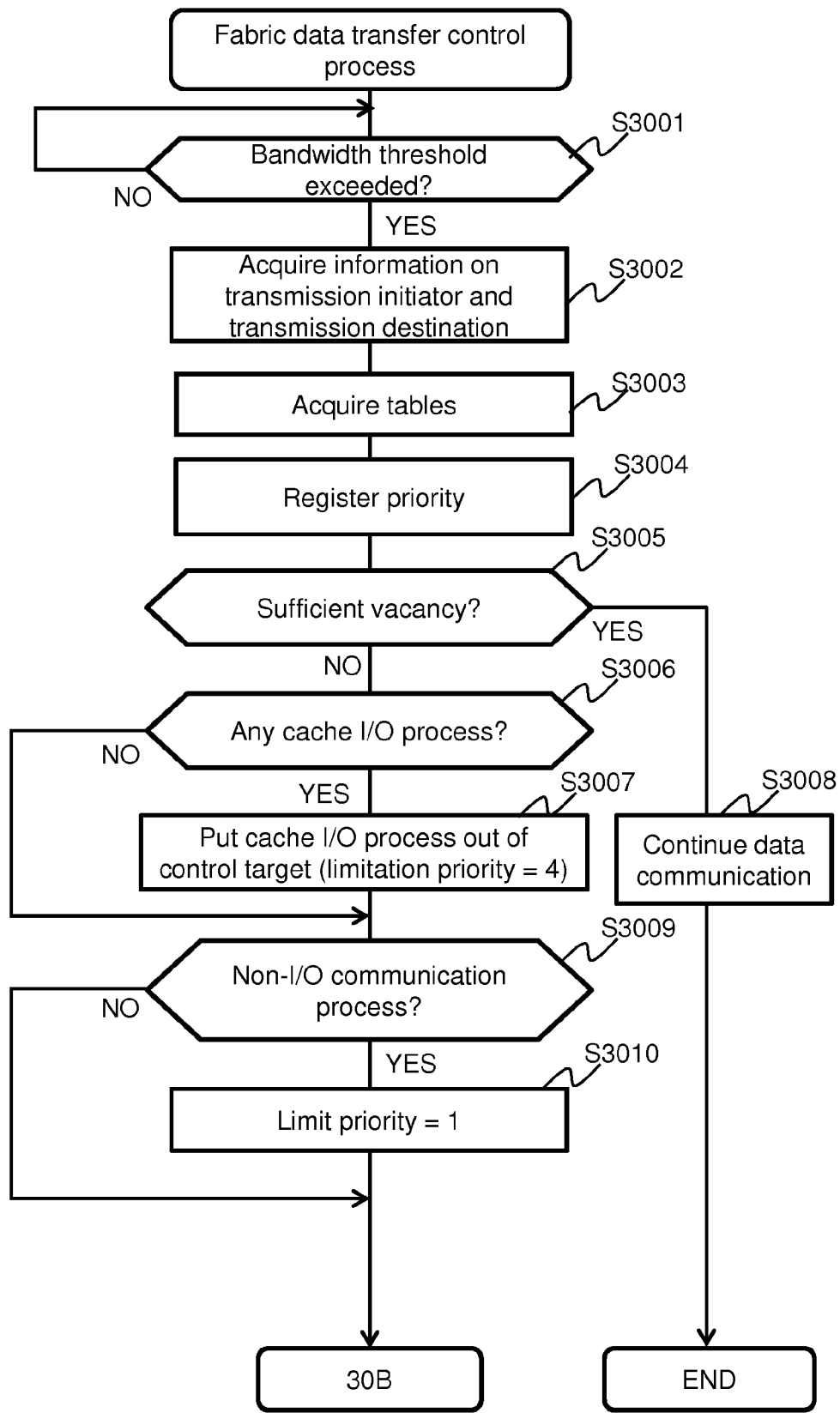
FIG. 30A shows apart of a flowchart of a fabric data transfer control process.
Figure 30B:
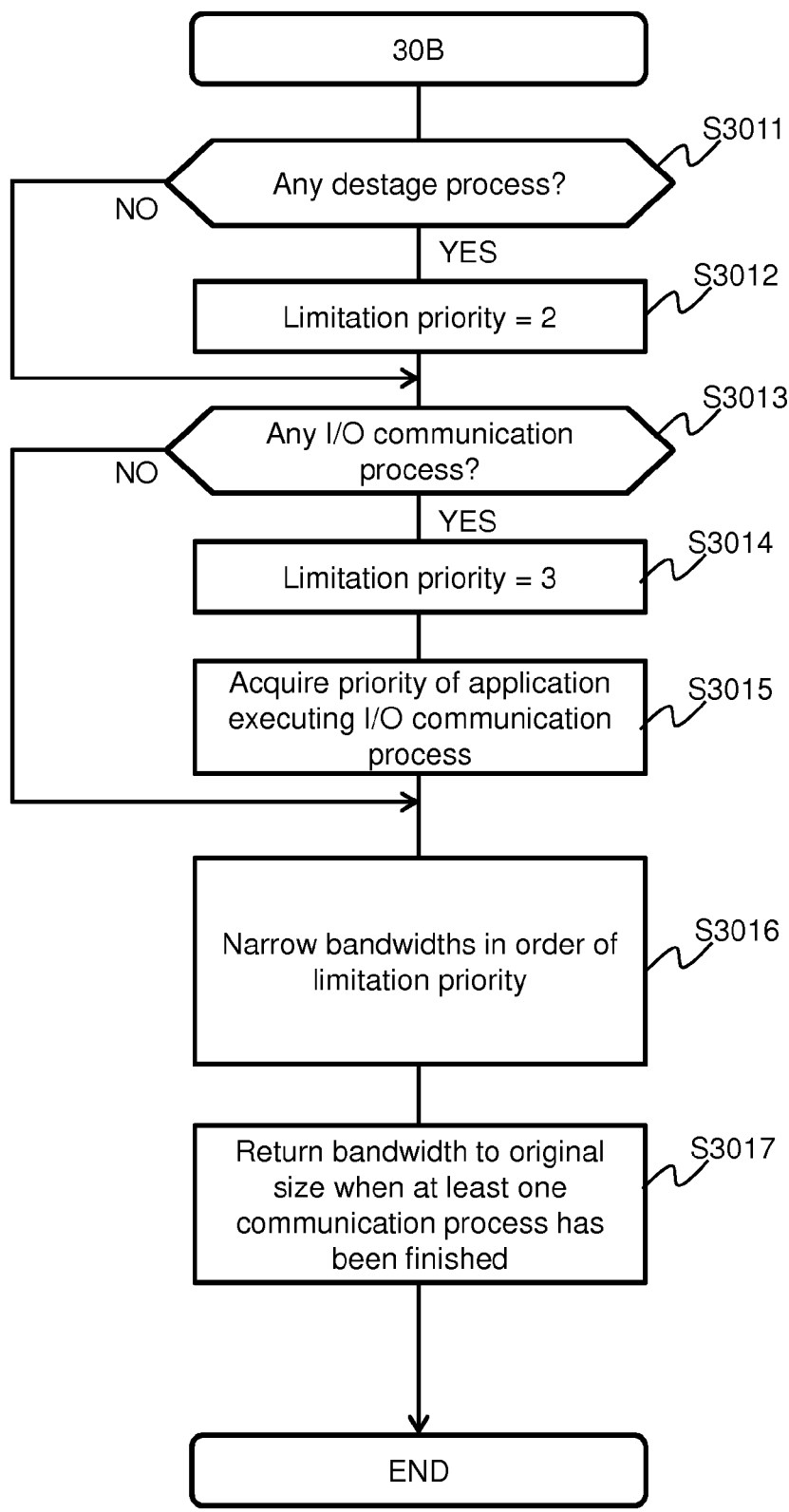
FIG. 30B shows the remainder of the flowchart of the fabric data transfer control process.

FIG. 30A and FIG. 30B show a flowchart of a fabric data transfer control process (S2905 in FIG. 29). This process is performed by executing the fabric control program 52, for example. In the description of FIG. 30A and FIG. 30B, the virtual CTL in the read process is referred to as a "target virtual CTL", and the blade implementing the target virtual CTL is referred to as a "target blade".

In S3001, the fabric control program 52 determines whether or not the amount of data of communication performed by the target virtual CTL (or the target blade) has exceeded a threshold for the bandwidth. Specifically, for example, the resource monitoring program 55 executed by the target virtual CTL monitors the amount of data of communication performed by the target virtual CTL, and issues an alert when the amount of data has exceeded a first threshold. Alternatively, for example, the resource monitoring program 55 executed by the target blade, not the target virtual CTL, monitors the amount of data of communication performed by the target blade, and issues an alert when the amount of data has exceeded a second threshold. The fabric control program 52 determines whether or not such an alert has been issued. In the case where the result of the determination in S3001 is true (S3001: YES), S3002 is performed. In the case where the result of the determination in S3001 is false (S3002: NO), the fabric control program 52 may terminate the fabric data transfer control process, or may perform the determination in S3001 again a constant time later. In the case where there is no such alert as described above even when S3001 is performed a predetermined number of times, the fabric control program 52 may terminate the fabric data transfer control process.

In S3002, the fabric control program 52 acquires information on the transmission initiator and the transmission destination of a storage read command. The information on the transmission initiator of a storage read command may be the identifier of a virtual server, for example. The information on the transmission destination of a storage read command may be the identifier of an I/O module serving as the transmission destination of a PDEV read command according to the storage read command.

In S3003, the fabric control program 52 reads the blade bandwidth management table 63, the I/O module bandwidth management table 66, the backbone bandwidth management table 69, and the cache bandwidth management table 73 from the cache 22.

In S3004, the fabric control program 52 acquires the profile table 83, and stores the table 83 in the cache 22. The profile table 83 may be acquired in advance in the system resource assignment process or the like, and stored in the cache 22. Alternatively, the profile assignment management table 76 may include the priority 807 possessed by the profile table 83.

In S3005, the fabric control program 52 determines whether or not there is a sufficient vacancy in the bandwidth of the path used in communication according to the storage read command (the path set in the converged system 2). Hereinafter in the description of FIG. 30A and FIG. 30B, the path will be referred to as a "target path". The term "sufficient vacancy" may indicate a vacancy that is equal to or more than the bandwidth according to the amount of data of communication performed in accordance with the storage read command. In the case where the result of the determination in S3005 is true (S3005: YES), the fabric control program 52 decides to continue data communication (S3008), and terminate the process. In the case where the result of the determination in S3005 is false (S3005: NO), S3006 is performed.

In S3006, the fabric control program 52 determines whether or not a cache I/O process that uses the target path is present in the target virtual CTL or the target blade. The cache I/O process that uses the target path is provided for I/O of data to and from the cache 22 (or an FM device area serving as a cache area) via the target path. In the case where the result of the determination in S3006 is false (S3006: NO), S3009 is performed. In the case where the result of the determination in S3006 is true (S3006: YES), S3007 is performed.

In S3007, the fabric control program 52 maintain the bandwidth use status of the target path by putting the cache I/O process that uses the target path out of the bandwidth control target.

In S3009, the fabric control program 52 determines whether or not a communication process for purposes other than I/O of data (hereinafter, a non-I/O process) is present in the target virtual CTL or the target blade. The term "non-I/O process" may indicate a communication process not included in processes performed in response to an I/O command (a write command or a read command) from the virtual server, and may indicate a communication process for a copy process (e.g. for copy between VOLs). The communication counterpart in the non-I/O communication process is a blade or an I/O module. In the case where the result of the determination in S3009 is true (S3009: YES), S3010 is performed. In the case where the result of the determination in S3009 is false (S3010: NO), S3011 is performed.

In S3010, the fabric control program 52 imparts a priority of "1", which is the highest as the priority for bandwidth limitation, to the non-I/O communication process that is present. In the following description, the priority for bandwidth limitation is referred to as the "limitation priority".

In S3011, the fabric control program 52 determines whether or not a destage process is present in the target virtual CTL or the target blade. In the case where the result of the determination in S3011 is true (S3011: YES), S3012 is performed. In the case where the result of the determination in S3011 is false (S3011: NO), S3013 is performed.

In S3012, the fabric control program 52 imparts a limitation priority of "2" to the destage process that is present.

In S3013, the fabric control program 52 determines whether or not a communication process for I/O of data (hereinafter, an I/O communication process) is present in the target virtual CTL or the target blade. The term "I/O communication process" may indicate a communication process (excluding the destage process) included in processes performed in response to an I/O command (a write command or a read command) from a virtual server. In the case where the result of the determination in S3013 is true (S3013: YES), S3014 is performed. In the case where the result of the determination in S3013 is false (S3013: NO), S3016 is performed.

In S3014, the fabric control program 52 imparts a limitation priority of "3", which is the lowest, to the I/O communication process that is present.

In S3015, the fabric control program 52 acquires the priority 807 of the profile (application) related to the I/O communication process from the table 83 stored in S3004. The term "profile (application) related to the I/O communication process" may indicate a profile (application) to which both the virtual CTL which performs the I/O communication process and the virtual server which transmitted the write command or the read command which caused the I/O communication process to be performed are assigned, for example.

In S3016, the fabric control program 52 narrows the bandwidth more for a communication process with a higher limitation priority. This allows the communication bandwidth for the non-I/O communication process to be narrowed the most, the communication bandwidth for the destage process to be narrowed the second most, and the communication bandwidth for the I/O communication process to be narrowed the least. Consequently, it is expected that the I/O communication process is performed as fast as possible. For the I/O communication processes to which a limitation priority of "3" has been imparted, the bandwidth may be narrowed to a greater degree as the acquired priority 807 (the priority 807 of the application) is lower.

In the case where any of the communication processes to which a limitation priority has been imparted is terminated, in S3017, the fabric control program 52 returns any of the narrowed bandwidths to its original bandwidth size. A communication process with a lower limitation priority may be returned to its original bandwidth size earlier. For the I/O communication processes with a limitation priority of "3", an I/O communication process with a higher priority 807 of the application may be returned to its original bandwidth size earlier.

The fabric data transfer control process allows the bandwidth in the path in the converged system 2 to be suitably adjusted. Specifically, bandwidth control is performed without affecting the cache I/O process and while maintaining a state in which the I/O communication process is performed as fast as possible.

The fabric data transfer control process may be performed regularly, or may be started each time an alert is issued from the resource monitoring program 55 which is run regularly.

Figure 31:
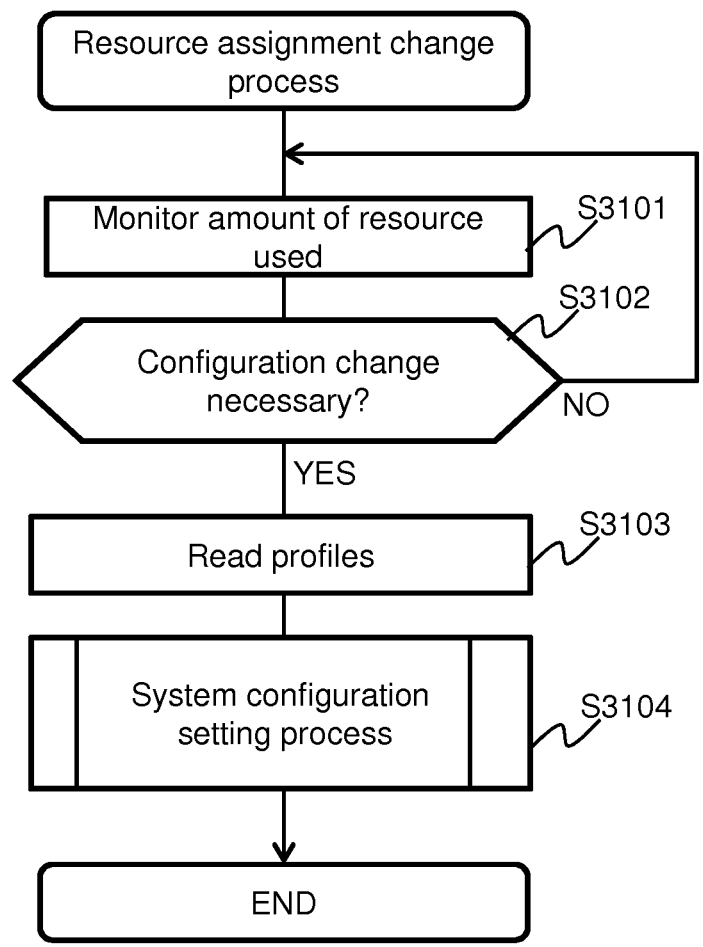
FIG. 31 is a flowchart of a resource assignment change process.

FIG. 31 is a flowchart of a resource assignment change process.

In S3101, the resource management program 84 monitors the amount of resource used by the converged system 2. Specifically, for example, in the converged system 2, the resource monitoring program 55 may monitor the amount of resource used, and may regularly transmit a report according to the monitoring result to the resource management program 84. The report may include, for each application (profile), the measured performance, the amount of written data, the length of operation time, and the measured use bandwidth. The resource management program 84 may accumulate the received reports in the memory 12. The resource management program 84 may grasp the resource use status (such as the transition in performance of a virtual machine) for each application (profile) from the one or more accumulated reports.

In S3102, the resource management program 84 determines whether or not a configuration change is necessary. For example, the resource management program 84 determines whether or not a deficiency or an excess of resource for the performance 804 etc. of a profile has been detected N times or more (N is an integer of 1 or more) within a constant period on the basis of the grasped resource use status and the profile table 83. In the case where the result of the determination in S3102 is false (S3102: NO), S3103 is performed. In the case where the result of the determination in S3102 is true (S3102: YES), S3101 is performed.

In S3103, the resource management program 84 invokes the profile management program 81, and the profile management program 81 reads the profile table 83 from the memory 212.

In S3104, the profile management program 81 performs the system configuration setting process (FIG. 22). In the system configuration setting process in the resource assignment change process, for example, the profile management program 81 may display information possessed by the profile assigned to the deficient or excessive resource, information representing the resource (such as a virtual machine, a blade, and an I/O module) assigned to the profile, and information representing the type of the deficient or excessive resource (e.g. the CPU cores, the memory capacity, or the bandwidth). From such information, the user can grasp how to update which profile, whether to add or remove which resource, or the like.

According to the resource assignment change process, the configuration of the converged system 2 (such as the relationship between the profile and the resource) can be corrected.

While an embodiment has been described above, it should be understood that the present invention is not limited to the embodiment described above, and may be changed variously without departing from the scope and spirit of the present invention.

For example, in the embodiment described above, the storage resource assignment process is performed before the server resource assignment process, and thus blades 21 with a relatively larger number of CPU cores, of the plurality of blades 21, are preferentially turned into storage blades. However, the server resource assignment process may be performed before the storage resource assignment process, and thus blades 21 with a relatively larger number of CPU cores, of the plurality of blades 21, may be preferentially turned into server blades.

In addition, for example, the management computer 1 may function as the display computer discussed earlier (e.g. input and output consoles), and a device in the converged system 2 (e.g. a blade 21 (e.g. a master blade 21M)) may function as the management system (e.g. the management computer). Specifically, for example, the display computer may implement the profile input interface 82, and a device in the converged system 2 may execute the profile management program 81 and the resource management program 84. The profile table 83 and the profile template 86 may be stored in at least one of the memory of the display computer and the memory of the converged system (e.g. the cache 22).

In the converged system 2, at least one blade 21 (hereinafter, the master blade 21M) may change the logical configuration in the converged system 2 without receiving a system resource assignment indication from the management computer 1. For example, the master blade 21M may determine, from the result of resource monitoring performed by the master blade 21M (or another blade 21), whether or not a change in logical configuration is necessary. The "result of resource monitoring" may include, for each application (profile), the measured performance, the amount of written data, the length of operation time, and the measured use bandwidth, as with the report discussed earlier. In the case where the master blade 21M has specified from the result of resource monitoring that any of the conditions indicated by the profile assignment management table 76 is not met, or in the case where the master blade 21M has specified from the result of resource monitoring that any of the conditions indicated by the profile assignment management table 76 is met excessively, the result of the determination may be true. If the result of the determination is true, the master blade 21M changes the logical configuration in the converged system 2 such that any of the conditions indicated by the profile assignment management table 76 is met with as little excess or deficiency as possible on the basis of the tables 62, 65, 68, 72, 75, 76, and 77. For example, in the case where the performance of a first virtual server does not meet the performance 804 in the profile serving as the assignment destination for the first virtual server and the performance of a first virtual CTL excessively meets the performance 804 in the profile serving as the assignment destination for the first virtual CTL, the master blade 21M may change the assignment destination for one or more CPU cores on the blade executing the first virtual CTL from the first virtual CTL to the first virtual server. Thus, the master blade 21M (or another blade 21) may balance excess and deficiency in the physical resource portion assigned to the virtual server and excess and deficiency in the physical resource portion assigned to the virtual storage on the basis of the result of resource monitoring. That is, the master blade 21M (or another blade 21) may change the assignment target for an extra of the physical resource portion assigned to the virtual server from the virtual server to the virtual storage (that is, appropriate the extra for the deficiency in resource of the virtual storage), or change the assignment target for an extra of the physical resource portion assigned to the virtual storage from the virtual storage to the virtual server (that is, appropriate the extra for the deficiency in resource of the virtual server). Such flexible resource assignment is feasible for the following reasons: the physical configuration of the converged system 2, e.g. each blade 21 and each I/O module 24, are a physical resource portion that may be assigned to either a virtual server or a virtual storage; and communication between the blades 21 and communication between the blade 21 and the I/O module 24 are performed via the network switch 23 through an identical interface (e.g. PCIe).

In the converged system 2, the virtual storages can communicate with each other by way of or not by way of the I/O module 24. This allows data to be copied from a VOL of a first virtual storage to a VOL of a second virtual storage in the converged system 2, for example. In the converged system, in addition, a VOL of a second virtual storage may be assigned to an EVOL (externally coupled VOL) of the first virtual storage, the first virtual storage may provide the EVOL to the virtual server, and data written into the EVOL from the virtual server may be written from the first virtual storage to the VOL of the second virtual storage.

The profile table 83 and the profile management table 76 may be replaced with a table obtained by merging the tables 83 and 76. That is, one table may contain the information 801 to 806 and the information 903 to 906 for each application (profile). In this case, one record (row) in one table may correspond to one application (profile).

REFERENCE SIGNS LIST

1 Management computer
2 Converged system
21 Blade
24 I/O module

The invention claimed is:
1. A computer system comprising:
a computer sub-system,
wherein the computer sub-system comprises:

a switch device configured to relay communication according to a predetermined interface,
a cache memory coupled to the switch device,
a plurality of computer devices coupled to the switch device, and
a plurality of I/O (input/output) devices coupled to the switch device,
wherein each of the computer devices has a computer resource including a processor and a memory, and is configured to perform communication according to the predetermined interface,
wherein each of the I/O devices is configured to perform communication according to the predetermined interface,
wherein at least the plurality of computer devices are physical resources on which a virtual server as a virtual server apparatus and a virtual storage as a virtual storage apparatus are based, each of the computer devices being capable of implementing operation of both the virtual server and the virtual storage,
wherein a first computer device portion as a first portion of the plurality of computer devices is assigned to the virtual server;
wherein a second computer device portion as a second portion of the plurality of computer devices, an I/O device portion as at least a part of the plurality of I/O devices, and a cache portion as at least a part of the cache memory are assigned to the virtual storage,
wherein the virtual server is configured to issue an I/O command, the I/O command being transmitted from the first computer device portion to the second computer device portion, and the virtual storage is configured to perform I/O of data according to the I/O command by using the I/O device portion, and write data according to the I/O command into the cache portion,
wherein the computer system further comprises a management system configured to manage the computer sub-system,
wherein at least a part of the management system is present inside or outside the computer sub-system,
wherein the management system is configured to accept from a user a request desired by the user for an application,
wherein the management system is configured to store a plurality of application profiles, the plurality of application profiles being data each corresponding to an application and containing conditions required for the application,
wherein one or more of the conditions of an application profile match a request desired by the user for the application profile,
wherein the management system is configured to decide, for each of the plurality of application profiles, a virtual storage to be assigned to the application profile and a computer device portion to be assigned to the virtual storage, and a virtual server to be assigned to the application profile and a computer device portion to be assigned to the virtual server, on the basis of the conditions included in the application profile and a computer resource amount of each of the plurality of computer devices,
wherein the management system is configured to assign, for each of the plurality of application profiles, the virtual server and the virtual storage decided for the application profile;
wherein the virtual server is configured to execute an application corresponding to an application profile to which the virtual server has been assigned, wherein the plurality of I/O devices include a non-volatile semiconductor memory device (NVM device) with a limited number of writing times; and
wherein, in the case where a short-bandwidth profile is included in the plurality of application profiles, with this short-bandwidth profile being an application profile with an insufficient bandwidth matching conditions, the management system is configured to assign a memory area in the NVM device to a virtual server to be assigned to the short-bandwidth profile as a read cache area.

2. The computer system according to claim 1,
wherein the plurality of I/O devices include a non-volatile semiconductor memory device (NVM device) with a limited number of writing times,
wherein the management system is configured to assign a memory area in the NVM device to a virtual server to be assigned to a read intensive profile as a read cache area, the read intensive profile being an application profile corresponding to an application with a read intensive I/O characteristic; and
wherein the read cache area is a memory area into which data according to a write command are not written but data read in response to a read command and data predicted to be read thereafter with a high possibility are written.

3. The computer system according to claim 2,
wherein, in the case where a number of processor cores is less than a number necessary for a plurality of virtual storages to be assigned to the plurality of application profiles, the management system is configured to subtract the number of processor cores matching conditions for the read intensive profile from the number of necessary processor cores.

4. The computer system according to claim 2,
wherein the plurality of I/O devices include a first NVM device with a relatively shorter life and a second NVM device with a relatively longer life, and
wherein the read cache area is assigned preferentially from the first NVM device.

5. The computer system according to claim 1,
wherein the plurality of I/O devices include a first NVM device with a relatively shorter life and a second NVM device with a relatively longer life, and
wherein the read cache area is assigned from the first NVM device.

6. The computer system according to claim 1,
wherein the plurality of I/O devices include a non-volatile semiconductor memory device (NVM device) with a limited number of writing times, and
wherein the management system is configured to assign a memory area of the NVM device to a virtual storage assigned to a certain application profile, of the plurality of application profiles, as an area for storage.

7. The computer system according to claim 6,
wherein the management system is configured to assign a memory area from the NVM device to at least one of the virtual server and the virtual storage assigned to at least one of the plurality of application profiles as a cache area, and assign at least a part of the remaining area of the NVM device to the virtual storage assigned to the certain application profile as an area for storage.

8. The computer system according to claim 7,
wherein the plurality of I/O devices include a first NVM device with a relatively shorter life and a second NVM device with a relatively longer life, and wherein a memory area of the second NVM device is assigned as the area for storage preferentially over a memory area of the first NVM device.

9. The computer system according to claim 8,
wherein a memory area is assigned from the first NVM device to the virtual server as a cache area; and
wherein a memory area is assigned from the second NVM device to the virtual storage as a cache area.

10. The computer system according to claim 1,
wherein the management system first is configured to perform a first assignment process, the first assignment process being one of a storage assignment process, in which a computer device portion of the plurality of computer devices is assigned to the virtual storage, and a server assignment process, in which a computer device portion of the plurality of computer devices is assigned to the virtual server; and
wherein, in the case where a resource shortage is detected in a second assignment process, the second assignment process being the other of the storage assignment process and the server assignment process performed in the first assignment process, the management system is configured to reduce a computer device portion assigned to an application profile with a relatively lower priority, of the plurality of application profiles to which a computer device portion has been assigned in the first assignment process.

11. The computer system according to claim 1,
wherein the management system first is configured to perform a first assignment process, the first assignment process being one of a storage assignment process, in which a computer device portion of the plurality of computer devices is assigned to the virtual storage, and a server assignment process, in which a computer device portion of the plurality of computer devices is assigned to the virtual server; and
wherein, in the case where a resource shortage is detected in a second assignment process, the second assignment process being the other one of the storage assignment process and the server assignment process, the management system is configured to relax conditions for an application profile with a relatively lower priority, of the plurality of application profiles.

12. A control method for a computer system comprising a computer sub-system and a management system for the computer sub-system,
the computer sub-system comprising,
a switch device configured to relay communication according to a predetermined interface,
a cache memory coupled to the switch device,
a plurality of computer devices coupled to the switch device; and
wherein a plurality of I/O (input/output) devices coupled to the switch device,
wherein each of the computer devices having a computer resource including a processor and a memory and being configured to perform communication according to the predetermined interface;
wherein each of the I/O devices being configured to perform communication according to the predetermined interface; and
wherein at least the plurality of computer devices being physical resources on which a virtual server as a virtual server apparatus and a virtual storage as a virtual storage apparatus are based, and each of the computer devices being capable of implementing operation of both the virtual server and the virtual storage, the control method comprising:
accepting from a user, by the management system, a request desired by the user for an application;
storing, by the management system, a plurality of application profiles, the plurality of application profiles being data each corresponding to an application and containing conditions required by the application, and one or more of the conditions of an application profile match a request desired by the user for a requested application profile;
deciding, by the management system, for each of the plurality of application profiles, a virtual storage to be assigned to the application profile and a computer device portion to be assigned to the virtual storage, and a virtual server to be assigned to the application profile and a computer device portion to be assigned to the virtual server, on the basis of conditions included in the application profile and a computer resource amount of each of the plurality of computer devices; and
assigning, by the management system, for each of the plurality of application profiles, the virtual server and the virtual storage decided for the application profile,
wherein the plurality of I/O devices include a non-volatile semiconductor memory device (NVM device) with a limited number of writing times, and
wherein, in the case where a short-bandwidth profile is included in the plurality of application profiles, with this short-bandwidth profile being an application profile with an insufficient bandwidth matching conditions, the management system is configured to assign a memory area in the NVM device to a virtual server to be assigned to the short-bandwidth profile as a read cache area.

13. A management system comprising:
a communication interface device configured to communicate with a computer sub-system;
a memory; and
a processor coupled to the communication interface device and the memory,
wherein the computer sub-system comprising,
a switch device configured to relay communication according to a predetermined interface,
a cache memory coupled to the switch device,
a plurality of computer devices coupled to the switch device, and
a plurality of I/O (input/output) devices coupled to the switch device,
wherein each of the computer devices has a computer resource including a processor and a memory, and is configured to perform communication according to the predetermined interface,
wherein each of the I/O devices is configured to perform communication according to the predetermined interface,
wherein at least the plurality of computer devices are physical resources on which a virtual server as a virtual server apparatus and a virtual storage as a virtual storage apparatus are based, and each of the computer devices is capable of implementing operation of both the virtual server and the virtual storage,
wherein the processor is configured to accept from a user a request desired by the user for an application,
wherein the processor is configured to store a plurality of application profiles in the memory, the plurality of application profiles being data each corresponding to an application and containing conditions required by the application, and one or more of the conditions of an application profile match a request desired by the user for a requested application profile;

wherein the processor is configured to decide, for each of the plurality of application profiles, a virtual storage to be assigned to the application profile and a computer device portion to be assigned to the virtual storage, and a virtual server to be assigned to the application profile and a computer device portion to be assigned to the virtual server, on the basis of the conditions included in the application profile and a computer resource amount of each of the plurality of computer devices; and wherein the processor is configured to assign, for each of the plurality of application profiles, the virtual server and the virtual storage decided for the application profile, wherein the plurality of I/O devices include a non-volatile semiconductor memory device (NVM device) with a limited number of writing times; and wherein, in the case where a short-bandwidth profile is included in the plurality of application profiles, with this short-bandwidth profile being an application profile with an insufficient bandwidth matching conditions, the management system is configured to assign a memory area in the NVM device to a virtual server to be assigned to the short-bandwidth profile as a read cache area.

* * * * *